US011061959B2

(12) United States Patent
Gulati

(10) Patent No.: US 11,061,959 B2
(45) Date of Patent: Jul. 13, 2021

(54) METHODS AND SYSTEMS FOR REGULATORY INTELLIGENCE

(71) Applicant: Raj Kumar Gulati, Fishers, IN (US)

(72) Inventor: Raj Kumar Gulati, Fishers, IN (US)

( * ) Notice: Subject to any disclaimer, the term of this patent is extended or adjusted under 35 U.S.C. 154(b) by 113 days.

(21) Appl. No.: 16/529,790

(22) Filed: Aug. 2, 2019

(65) Prior Publication Data
US 2019/0354551 A1  Nov. 21, 2019

(51) Int. Cl.
| | |
|---|---|
| *G06F 16/635* | (2019.01) |
| *G06F 16/953* | (2019.01) |
| *G06F 16/638* | (2019.01) |
| *G06F 16/61* | (2019.01) |

(52) U.S. Cl.
CPC ............ *G06F 16/635* (2019.01); *G06F 16/61* (2019.01); *G06F 16/638* (2019.01); *G06F 16/953* (2019.01)

(58) Field of Classification Search
CPC ........ G06F 16/635; G06F 16/93; G06F 19/00; G06F 40/226; G06F 16/334; G06F 16/358; G06F 16/382; G06F 16/9024; G06F 16/13; G06F 16/1805; G06F 16/22; G06F 16/23; G06F 16/28; G06F 21/606; G06Q 10/10; G06Q 10/06; G06Q 50/26; G06Q 50/18; G06Q 30/0185; G06Q 30/0283; G06Q 50/04; G06Q 10/0635; G06Q 40/08; G06Q 50/00; G06Q 10/063; G06Q 10/06316; G06Q 10/067; G06Q 20/3674; G06Q 30/018; G06Q 40/00; G06Q 40/02; G06Q 40/12; G06Q 50/20
USPC ........................................................ 707/722
See application file for complete search history.

(56) References Cited

U.S. PATENT DOCUMENTS

| | | | | |
|---|---|---|---|---|
| 7,734,606 | B2 * | 6/2010 | Walker .................... | G06F 16/25 |
| | | | | 707/705 |
| 9,053,484 | B1 * | 6/2015 | Tulek ..................... | G06T 11/206 |
| 9,058,606 | B1 * | 6/2015 | Tulek ..................... | G06T 11/206 |
| 2006/0059137 | A1 * | 3/2006 | Walker .................... | G06F 16/25 |
| 2008/0178077 | A1 * | 7/2008 | Boucher ............... | G06F 16/382 |
| | | | | 715/266 |

(Continued)

*Primary Examiner* — Sheree N Brown

(57) ABSTRACT

Methods and systems are described for collecting, processing, classifying, structuring, transforming, relating, creating & linking audio recordings and reporting filtered data related to US FDA Warning Letters and Individual Citations for users to get regulatory intelligence from a database. Data is collected from multiple sources including FDA website. Individual Citations are parsed, isolated from their parent Warning Letters and subclassified to enable meaningful searches for users to assess regulatory compliance risks. Single topic records are created for each Individual Citation that is related to its corresponding Product Type, System, FDA Guidance for industry, Inspector name, 21 CFR section, Country, Company and Date of Warning Letter. Audio recordings are created for Individual Citations and Individual Warning Letter contents for listening purposes and integrated with the database. The system allows searches at two levels, one related to 'Individual Warning Letters', and two, for 'Individual Citations'. The system also helps users to analyze aggregate trends and metrics. Records are made accessible through a database on webserver upon user's request from a desktop, a mobile computing device or like devices via a graphical user interface.

9 Claims, 23 Drawing Sheets

(56) References Cited

U.S. PATENT DOCUMENTS

2020/0273046 A1\* 8/2020 Biswas ................ G06Q 30/018

\* cited by examiner

FIG. 4c equipment, training of employees in their respective job functions, and investigations.

Regarding the latter, since 2015 your firm was aware of various process performance (e.g., no or misplaced hole in tablets) and drug product quality data (e.g., recall due to dissolution failure) that indicated a lack of control of your laser drilled drug products. However, your firm failed to ensure timely investigations and corrective and preventative actions (CAPA).

We acknowledge that, in response to our inspectional findings, you performed a risk assessment and have voluntarily recalled an additional (b)(4) batches of laser drilled drug products due to the potential for some tablets to lack laser drilled hole(s).

In your response you stated that you have (b)(4). Also, in your fifth status report, dated January 10, 2019, you stated that you will be (b)(4).

424

In response to this letter, provide the following:

- A comprehensive, independent assessment with CAPA to ensure your QU is given the needed authority and resources to effectively discharge its function. The assessment should also include, but not be limited to:

o A determination of whether procedures used by your firm are robust and appropriate o Provisions for QU oversight throughout your operations to evaluate adherence to appropriate practices o Complete and final review of each batch and its related information to support an appropriate final QU disposition decision

440 o Oversight and approval of investigations and discharging of all other QU duties to assure identity, strength, quality, and purity of all drug products > 4. Your firm failed to thoroughly investigate any unexplained discrepancy or failure of a batch or any of its components to meet any of its specifications, whether or not the batch has already been distributed (21 CFR 211.192).
>
> Your firm did not adequately investigate drug product failures and significant defects. You lacked thorough investigations into root causes and failed to implement prompt and effective CAPA.
>
> For example:
>
> The Process Validation Report for paliperidone extended release tablets (No. 6516PTC Version #1.0 approved on September 22, 2015) showed that undrilled tablets or tablets drilled on the wrong side were accepted and not rejected by the vision system in two of the ten validation batches during the laser drilling stage. The root causes for these events were identified as dirty sensors and inadequate calibration of the grayscale accept limit due to human error by the maintenance mechanic, resulting in defective tablets not being rejected. However, the impact was considered "Minor" by your QU although issues with undrilled, or inadequately drilled, tablets continued.
>
> Your firm performed an investigation on September 6, 2016 in response to undrilled tablets found in the "accepted drum" during the processing of a lot of paliperidone extended release tablets. The root cause of this event was considered to be a mechanical design flaw of the Laser Drill P-4130 accepted tablet discharge chute (which was in very close proximity to the reject tablet discharge chute) causing rejected tablets to fall into the accepted tablet drum. However, your firm conducted another investigation for the same batch on April 27, 2017, in response to a dissolution testing failure at the (b)(4) room temperature stability time point. You concluded that the dissolution failure was due to an undrilled tablet and the cause was considered to be a guide rail misalignment caused by an operator or

FIG. 4d maintenance mechanic. As a result, you state that tablets became off-center on the conveyor and missed the laser trigger sensor and vision system sensors. You also cited inadequate procedures for segregating rejected tablets. Two investigations identified two different possible root causes for undrilled tablets in the same batch of drug product. Neither sufficiently addressed the fundamental failure to adequately drill a hole in the tablet. Also, the QU failed to extend their investigation to other batches of laser drilled drug products previously processed on this equipment.

In your responses you commit to [b)(4) ----- 424

In response to this letter, provide the following:

- Results of your [b)(4) ----- 424
- Summary of how you will improve identification of potential human error risks in future process designs and root cause evaluations and enhance your overall risk reduction program in these areas.
- A comprehensive, independent assessment of your overall system for investigations of deviations, atypical events, complaints, out-of-specification results, and failures. Your CAPA should include but not be limited to improvements in investigation competencies, root cause analysis, written procedures, and QU oversight. Also include your process for evaluating CAPA effectiveness.

Repeat Observations at Facility
In previous inspections (December 2013, January 2016, and November 2017), FDA cited similar CGMP observations. You proposed specific remediation for these observations in your responses. These repeated failures demonstrate that executive management oversight and control over the manufacture of drugs is inadequate.

461 ——
Process Controls
Your firm does not have an adequate ongoing program for monitoring process control to ensure stable manufacturing operations and consistent drug quality. See FDA's guidance document *Process Validation: General Principles and Practices* for general principles and approaches that FDA considers appropriate elements of process validation at https://www.fda.gov/downloads/Drugs/GuidanceComplianceRegulatoryInformation/Guidances/UCM070336.pdf (https://www.fda.gov/downloads/Drugs/GuidanceComplianceRegulatoryInformation/Guidances/UCM070336.pdf) —— 452

463 ——
CGMP Consultant Recommended
In your response, you indicated that you have retained services of third-party consultants. Based upon the nature of the violations we identified at your firm, we strongly recommend engaging a third party and ensuring they are qualified as set forth in 21 CFR 211.34, to assist your firm in meeting CGMP requirements. It is important that the consultants have expertise in the specific areas of deficiency cited at your facility. Your use of a consultant does not relieve your firm's obligation to comply with CGMP. Your firm's executive management remains responsible for fully resolving all deficiencies and ensuring ongoing CGMP compliance.

Conclusion
Violations cited in this letter are not intended as an all-inclusive list. You are responsible for investigating these violations, for determining the causes, for preventing their recurrence, and for preventing other violations.

If you are considering an action that is likely to lead to a disruption in the supply of drugs produced at your facility, FDA requests that you contact CDER's Drug Shortages Staff immediately, at drugshortages@fda.hhs.gov, so that FDA can work with you on the most effective way to bring your operations into compliance with the law. Contacting the Drug Shortages Staff also allows you to meet any obligations you may have to report discontinuances or interruptions in your drug manufacture under 21 U.S.C. 356C(b) and allows FDA to consider, as soon as possible, what actions, if any, may be needed to avoid shortages and protect the health of patients who depend on your drug products.

Correct the violations cited in this letter promptly. Failure to promptly correct these violations may result in legal action without further notice including, without limitation, seizure and injunction. Unresolved violations in this warning letter

FIG. 4e may also prevent other Federal agencies from awarding contracts.

Until these violations are corrected, we may withhold approval of pending drug applications listing your facility. We may re-inspect to verify that you have completed your corrective actions. We may also refuse your requests for export certificates.

After you receive this letter, respond to this office in writing within 15 working days. Specify what you have done since our inspection to correct your violations and to prevent their recurrence. If you cannot complete corrective actions within 15 working days, state your reasons for delay and your schedule for completion. Please identify your response with FEI 3003194604.

Your written notification should refer to the Warning Letter Number above (Case #567857). Please electronically submit your signed reply on your firm's letterhead to CDR John W. Diehl, M.S., Director, Compliance Branch, at john.diehl@fda.hhs.gov and orapharm2_responses@fda.hhs.gov.

If you have questions regarding the contents of this letter, please contact H.L. Jamillah Selby, Compliance Officer, at 214-253-5218 or jamillah.selby@fda.hhs.gov.

Sincerely,
/S/
Monica R. Maxwell
Program Division Director
Office of Pharmaceutical Quality Operations, Division II Cc:

Sergio Vella, Senior Vice President
Teva Pharmaceutical Industries Ltd.
400 Interpace Parkway, Building A
Parsippany, New Jersey 07054

Kare Schultz, CEO and President
Teva Pharmaceutical Industries Ltd.
5 Basel Street
Petach Tikva, Israel 49131

Renee Alsobrook, Chief
Department of Business and Professional Regulation
Division of Drugs, Devices and Cosmetics
Compliance and Enforcement
2601 Blair Stone Road
Tallahassee, Florida 32399-1047

METHODS AND SYSTEMS FOR REGULATORY INTELLIGENCE

FIELD OF THE INVENTION

The present invention relates to a regulatory intelligence and analytics tool that enables users to perform custom searches and trend analysis of violations, deviations and recommendations (collectively termed as 'citations' for the purpose of this invention) at the granular level of "Individual Citations" as stated in US Food and Drug Administration's (FDA's) Warning Letters issued to companies due to non-conformance against regulatory requirements. It is the ability to quickly and conveniently search, retrieve and analyze the Individual Citations across Warning Letters for specific information to fulfill needs of different types of users based on including but not limited to specific product or operation type, Quality System, FDA Guidance for industry, text with or without Audio Recording for listening, 483 inspector name, 21 CFR regulatory section text where applicable, Country, Company, Date range and Keyword of user's interest in Individual Citation. The system enables users to preferred searches based on at least one or a combination of two or more search parameters listed above and get information in text and audio format.

BACKGROUND OF THE INVENTION

Companies that are involved in the food, drugs and cosmetics business in USA are required to comply with the Food and Drug Administration (FDA) regulations set forth under the Federal Food, Drug and Cosmetic Act (FD&C Act). When FDA finds through its routine inspections or based on complaints that a company has significantly violated regulations, the FDA notifies the company.

For example, pharmaceutical manufacturers, both in and outside the United States, who sell their products in USA are required to comply with Current Good Manufacturing Practice (CGMP) regulations. To assess the CGMP compliance status of such manufacturing facilities, FDA investigators (also known as 'inspectors' and these terms are used interchangeably here) routinely perform their inspections. At the conclusion of an inspection, an FDA Form 483 is issued to the firm when an FDA investigator(s) has observed any conditions that in their judgement may constitute violations of the FD&C Act and related Acts. The FDA Form 483 lists observations made by the FDA representative(s) during the inspection of the facility. Form 483 does not constitute a final Agency determination of whether any condition is in violation of the FD&C Act or any of its relevant regulations. Examples of FDA Form 483s issued to drug manufacturers and other categories like food, cosmetics, etc.) can be found at the FDA's website (www.fda.gov). Form 483 also contains the names of the investigators. Not all Form 483s that are issued by FDA are published on the FDA website. However, they can be obtained if required, by submitting requests to the FDA Freedom of Information (FOI) Office.

If it is determined that any such companies exhibit significant violations or deviations from the requirements that are of regulatory significance i.e. those that may actually lead to an enforcement action if the documented violations are not promptly and adequately corrected, then these companies can be issued Warning Letters.

Each Warning Letter issued by US FDA is posted on the FDA website (www.fda.gov) for public access under the Freedom of Information Office, informing the public that the products manufactured by the specified manufacturer do not comply with FDA's regulatory requirements. The FDA's website publishes new Warning Letter(s) almost on a weekly basis, that it has issued. There are various categories of Warning Letters such as: Food articles, Tobacco, Medical Devices, Finished Pharmaceuticals, Active Pharmaceutical Ingredients, Pharmacy, Dietary Supplements, Clinical Investigator, Advertising & Marketing, Veterinary products, etc. are issued by various offices of FDA. A Warning Letter contains information on non-conformances against the specific regulations that apply to the category of the Warning Letter that it applies to, such as Current Good Manufacturing Practice (CGMP) regulations for manufacturing sites, Good Clinical Practice (GCP) regulations for clinical activities, Good Laboratory Practice (GLP) for certain types of laboratory activities, etc.

A Warning Letter, which is addressed to the firm's management states specific violations and/or deviations from CGMP at the site and may also contain recommendations to help address the violations or deviations. A violation, deviation or recommendation listed in a Warning Letter, typically comprises two parts: (1) One or two sentence summary description of the specific violation or deviation by the firm against a regulatory requirement generally along with a reference to the particular section of the regulation whose requirement has been violated (e.g. 21 CFR Part 211.192 for a Finished Pharmaceutical); or a title heading where a recommendation is being made. (2) Supporting details based on which the FDA has determined that the firm has violated or deviated from a compliance requirement and may also contain information on what response the FDA expects from the firm and references to FDA Guidances. These details can run into multiple paragraphs. For the purpose of this disclosure, the term 'Citation' is used to represent violations, deviations and recommendations that are stated in FDA's Warning Letters. Generally, a typical Warning Letter issued to a drug manufacturer contains about four Citations, but they can range between one to eight.

Some text in published Warning Letters is redacted or edited to remove confidential information e.g. the name of the pharmaceutical product in a Finished Pharmaceuticals Warning Letter. Publishing these Warning Letters can adversely affect the reputation of the manufacturers making those products impacting their sales and stock market value. Such non-conformances can also negatively impact the supply of some much-needed medicines due to potential shortages, and hence can directly or indirectly impact drug prices of competitive products that the consumers end up paying. As a result, the overall impact, both for the drug manufacturers and the patients who need such medicines, can be potentially negative. Therefore, it is important for drug manufacturers to identify high-risk areas of non-compliance that are being published in the Warning Letters and then proactively build their quality systems well to prevent issuance of such Warning Letters to them and ensure consistent supply of right quality medicines to the patients.

In highly regulated industries like pharmaceutical industry, for companies to produce the right quality products they need to understand the regulatory expectations of FDA investigators so that they can proactively put their resources into building robust and CGMP compliant systems for their manufacturing facilities and have successful inspections. If the personnel working in different functional areas on manufacturing site, have a good way of sifting through the myriad of Warning Letters over a period of time and can get a filtered listing of Individual Citations that inform them of the key citation trends for their specific area of responsibility, they can then focus their resources better based on the intelligence gathered to prepare systems for their specific functional area to be CGMP compliant. However, getting such specific information at the granularity level of singular citations filtered across a multitude of Warning Letters could be an extremely difficult, time-consuming and resource intensive task. An example provided below from the pharmaceutical industry which comprises a significant proportion of the Warning Letter issued is illustrates the nature of regulatory intelligence needs.

Firstly, the manufacturing sites are generally set up to make a single type of finished pharmaceutical product. Rarely does a site have multiple types of operations or Product Types. For example, a manufacturing site either manufactures 'oral' products (e.g. tablets, capsules, syrups) or 'topical' products (e.g. ointments, creams, lotions) or 'sterile' products (e.g. injections, eye drops). They are generally not or are rarely set up to produce two or more Product Types; but the Warning Letters only state if the violations are for 'Finished Pharmaceuticals'. The Warning Letters typically do not specify the next level of classification, i.e. the Product Type whether oral, topical or sterile as stated above. Any reference made in a Warning Letter regarding the product that is manufactured at the site is often redacted by the FDA prior to its publication on the FDA website. The FDA Form 483s which contain inspectional findings also do not typically specify the next level of classification for the Product Type. Mostly, they only state the main "Category" (e.g. Drug Manufacturer, Finished Product Manufacturer, OTC Drug Manufacturer, Drug Product Manufacturer, Manufacturer) but the sub-category or sub-classification of the Product Type of Finished Product is generally not explicitly stated. It is very rare that one may find this explicitly stated in the Form 483. For the purpose of the description of this invention the terms Finished Pharmaceutical, Finished Product, Finished Dosage Form (FDF) and Drug Product are considered equivalent and can be used interchangeably. Because the information on the Product Type of the Finished Pharmaceuticals is not apparent, it becomes very difficult for professionals in the industry to zero-in on the data and trends that are applicable their specific Product Type across a multitude of Warning Letters.

Secondly, to manufacture each Product Type, whether oral, topical or sterile, there are multiple people involved within a manufacturing plant who work in different departments or functional areas that have specific responsibilities with regards to completing specific steps of the drug manufacturing process e.g. Production, Laboratory, Quality, Packaging and Labeling, Material Management, Facilities and Equipment. Each one of such departments or functional areas have a set of Standard Operating Procedures which constitute a 'System' based on which the company's management train their people to run their specific functions and perform their duties. Each functional area needs to have their 'System' designed to meet the CGMP requirements for their Product Type in order to stay in compliance with regulations. For example, the 'Laboratory' function for Topical products, which is run by personnel trained in testing methodology needs information on citations related to 'Laboratory Control System' for Topical products; 'Facilities & Equipment' function for Sterile products, which is run by personnel trained on engineering aspects needs information on citations related to 'Facilities & Equipment System' for Sterile products; 'Production' department for oral products, which is run by people trained in production operations needs information on citations related to 'Production System' for Sterile products; 'Quality' unit for Oral products, which is run by people trained in quality assurance and control needs information on citations related to 'Quality System' for Oral Product Type.

However, the Warning Letters do not refer or classify Citations according to the system or functional area. Such limitations make it difficult to get meaningful information in order to make well-informed decisions and allocation of resources based on risk-assessment. Like the above, there are other regulatory intelligence needs that manufacturers have specific for their areas of interest at the Individual Citation level from the FDA Warning Letters.

In addition, given the fact that a large number of professionals spend significant time commuting to work from home or traveling, the emerging changes in the life styles and pursuit of higher productivity while they are on the go (like commuting, jogging, walking) has led people to assimilate information through means that does not require them to sit in front of their computer or looking at their screen/monitor e.g. by listening to the audio formats of information of their interest in their car while during their commute in bus or train, or while exercising (e.g. jogging or walking). There is currently no place for this type of regulatory information to be searched, analyzed and delivered at the level of Individual Citations across FDA Warning Letters that is classified, organized, processed and delivered in a way to address users' needs to suit the changing ways by which users consume information nowadays as described.

A few data products and services do provide some limited search capabilities but those are at the level of 'full-text Warning Letter', none at the level of the granularity of 'individual' Citations that can be isolated from across Warning Letters and classified individually on multiple dimensions to enable users get regulatory intelligence in ways that are more meaningful, quick and convenient. Consequently, the aggregate metrics and trends for Individual Citations in the Warning Letters can also not be presented as meaningfully to the users (e.g. by Product Type or by FDA Guidance for Industry or System) because they are not classified (or categorized) at the individual level. In addition, none of the providers offer the functionality where the individually filtered citations can be found in their audio-recorded format that can be listened on a device even when the user is on the go. Furthermore, even if a service provides searching the 'full-text' Warning Letters (not the 'Individual Citations'), such as by company name or date that can enable the display of a full Warning Letter in its text format on a web page, there is no audio recorded format available for users to listen to the individual Warning Letter contents.

Some organizations exist that provide information on Warning Letters, either publicly or by subscription. As stated above, the US FDA FOI Office publishes this information on its website, and users can search full-text Warning Letters by company, issuing office (at FDA), year and subject. This information is available at no charge to the public.

Other entities that provide information in this domain (full text Warning Letters and/or 483s and related materials published by FDA) for a fee are fdanews.com, fdazilla.com, fdainfo.com, foiservices.com. These companies primarily obtain "full-text documents" from FDA FOI Office for a fee, organize them to enable basic search and then resell such documents to the users. Examples of companies who operate in this space and their primary services, based on information from their website include: (1) fdanews.com, provides "full-text" FDA Form 483s that a user can search by: company, investigator, region, keyword in the 483, category (drug, device, clinical). (2) fdazilla.com, provides "full-text" documents and related metrics on Form 483s, Establishment Inspection Reports (EIRs) and Warning Letters that can be searched (e.g. by company name, investigator name). The Warning Letters are provided at the "full-text" level. (3) foiservices.com, provides "full-text" documents of multiple types that are obtained from FDA that are searchable. (4) fdainfo.com, also provides "full text" Warning Letters. References on similar subject are also found in patent number U.S. Ser. No. 00/929,2623B2 by Walker and patent number U.S. Ser. No. 00/921,217B2 by Gordon et al.

In none of these cases is the information provided at the "Individual Citation" level over a period that cuts across multiple Warning Letters. Further, there is no provision for a user to get filtered listings of Individual Citations for a Category of the Warning Letters that are sub-classified based on Product Type (e.g. where Finished Pharmaceuticals Category get further sub-categorized or sub-classified into Oral, Topical or Sterile types) as described earlier and/or System and/or FDA Guidance for Industry cited and/or Audio Recording of the Individual Citations in the Warning Letters and/or Audio Recordings of the individual Warning Letters.

Given the full-text documents of Warning Letters from the resources discussed above, if a pharmaceutical professional who has responsibility to ensure CGMP compliance and successful FDA inspection of a testing Laboratory for 'Sterile' finished pharmaceutics, were to answer a question like: "What are the Citations in the FDA Warning Letters for 'Laboratory Control System' for 'Sterile' product manufacturing sites over the last three years?", he/she would have to follow an extremely complex, difficult and time-consuming process that will involve the following steps: (1) Go to the FDA website or another service provider of 'full-text' Warning Letters (2) Identify the specific Warning Letters related to drug manufacturing by sorting through the mix of different types Warning Letters for the last three years. (3) Open and read each one of the Warning Letter (4) Try and determine which Warning Letters apply to Finished Pharmaceuticals. (5) Isolate or separate those Warning Letters them (6) Try to determine what type of Finished Pharmaceutical it could be, whether it is for a Sterile (like Injections) or Topical (like Ointments, Creams) or Oral (like tablets, capsules). As stated above, this can be difficult because such information typically is not explicitly provided in the Warning Letter. One may have to go to other sources of information to make this determination. (7) If successful, sort and separate the Warning Letters that apply to Sterile Finished Pharmaceuticals from others (8) Then, read each letter and identify those Individual Citations where references to Laboratory related violations, deviations or recommendations have been made (9) Isolate to filter out those laboratory related citations from other citations from every Warning Letter (and make a listing to perform a business evaluation) (10) Classify and/or categorize further, if needed, e.g. identify the FDA guidance for industry related to Laboratory subject wherever referred in the citations (11) And then use this information to analyze risks relative to one's own situation. As one would note, this process can be both labor-intensive and highly time-consuming incurring significant costs which most people like to avoid. For similar information on another Product Type (e.g. Oral), the same process would need to be repeated all over again!

Instead of reading each Warning Letter one at a time, which has a mix of observations listed on different aspects of CGMP compliance for a single firm/manufacturing site, if there were a quick and easy way that could systematically help provide only the necessary information filtered to address specific users' needs to perform specific analysis, study trends and deliver the right information in a way that is efficient for the industry practitioners, it would greatly facilitate them in taking steps to strengthen their systems for ensuring CGMP compliance. What is needed is a tool where citations in each Warning Letter are isolated at their most granular level of Individual Citation along with the parsing of other components of the Warning Letter, and then each Individual Citation classified in multiple ways that are more meaningful for the user to search easily and quickly while this information can also be conveniently delivered via a mode that enhances productivity even while the user is on the move e.g. get regulatory information by listening to the audio recorded format while driving or walking. Thereby, the potential high risks to non-compliance for which the firms get Warning Letters can be pro-actively addressed and products of right quality can get manufactured more consistently for the benefit of both public and the industry in the right manner the first time instead of learning through costly mistakes.

Based on the above, there is a need to have a system for practitioners in this field, where each 'Individual Citation' (both the violation along with its supporting facts) is isolated at its most granular level individually from its parent Warning Letter, and classified on parameters that are of meaningful relevance for the user wherein a user can then search for these citations at their individual level that can be presented and delivered with speed and convenience enabling them to take informed regulatory compliance decisions for the Product Type that matters to them, efficiently and effectively. The present invention provides systems and methods that address such a need as stated above.

SUMMARY OF THE INVENTION

To address the unmet needs as described above, the present invention provides users with tools to search the contents across US FDA's Warning Letters to get regulatory intelligence in the text and audio format not only at the individual Warning Letter level but also at the Individual Citation level based on multiple search criteria of user's interest. To provide a basic understanding of some aspects of the claimed subject matter, the following presents a simplified summary. To explain the embodiments of this invention, examples of Warning Letters related to the manufacture of Finished Pharmaceuticals who are required to conform to CGMP regulations, will be used for illustration and description purposes.

The primary objective of this invention is to provide systems and methods for collecting, structuring, relating, classifying, transforming, analyzing text, creating & integrating Audio Recordings and reporting summarized data on regulatory (e.g. CGMP) violations, deviations and recommendations (collectively termed as 'Citations') at the most granular level of Individual Citations isolated from Warning Letters issued by the US FDA. The system also allows for users to perform searches at the individual Warning Letter level. As is apparent, the relationship between a Warning Letter and its Citations is akin to a Parent-Child relationship, since a specific set of Individual Citations belong to a corresponding single Warning Letter.

In one aspect of the various exemplary embodiments, a method to filter Individual Citations based on user's custom search criteria via a graphical user interface (GUI) on a computer is presented. The method comprising—the user selects any one or any combination of two or more criteria from any of these parameters to perform searches at the Individual Citation level: Product Type (or operation type), Quality System (the term 'System' will be used to represent 'Quality System'), FDA Guidance for industry, citations with text only or with text along with Audio Recording for listening purposes, 483-Inspector name, 21 CFR regulation (when specified), Country, Company, Date range and Keyword in citations.

Method: (1) User selects the preferred search parameters and submits the query (2) a webserver that stores the Warning Letters and Citations database receives the user's request, retrieves the results based on user inputs (3) the webserver returns the output from the database (4) to the user's computer screen containing a filtered list of single topic records of Individual Citations in a human readable text format with associated hyperlinks to (5) the Warning Letter documents containing the full-text of the Warning Letter to which the Individual Citation record belongs and/or (6) Audio Recording of the related Individual Citation. The user can then either study the results displayed in the form of text and/or choose to listen to the filtered list of associated Audio Recordings of the individual citations to get regulatory intelligence information. The system is built to relate seemingly unrelated records that are integrated with ready-to-click hyperlinks to enable broad custom query execution on-demand to get results quickly.

In another embodiment like the above, the user can search and retrieve a filtered list of the Audio Recordings for individual Warning Letters along with links to their full-text document. The user's preferred search criteria is based on at least one or combination of any two or more of the following parameters: Product Type; Date range: Start Date and/or End Date during which Warning Letter issued; Company name of the firm to which the Warning Letter was issued; Location: name of the country and/or city of location of the company; 483-Inspector name on the FDA Form 483 that lead to the Warning Letter.

The system also allows users to perform searches by date-range to study the aggregate trends and metrics over period of time in tabular and graphical form for (a) Individual Warning Letters: such as the trend of Warning Letters issued by Product Type (b) the Individual Citations: such as the their distribution based on the System they represent, FDA Guidances for Industry cited.

The system also provides a method of sub-categorizing or sub-classifying Warning Letters based on the Product Type they represent.

These and other features (including drawings) that are described in the detailed description that follows are exemplary and explanatory only. They should not be considered restrictive of the scope of the invention as described and claimed. These features along with related variations e.g. combinations and sub-combinations of the features and search parameters, can be made through practice of this invention as set forth hereinafter.

BRIEF DESCRIPTION OF DRAWINGS

The accompanying drawings help in understanding the various embodiments of this invention. Those persons of skill in the art will understand that these drawings are used for teaching the typical embodiments of this invention and are not intended to limit the scope of this invention. Other embodiments of this invention may be produced without departing from the scope and spirit of this disclosure. The drawings are therefore intended for illustrative, exemplary and reference purpose only. A solid rectangular outline structure in black lines is used around the specific text, component or steps to demarcate and identify it by reference characters (numerals) to help explain the description of the drawings. This style applies to all drawings referred in this description. Where the same numeral appears in multiple drawings, it is intended to refer to the same or like components or steps.

FIG. 4a-f illustrate a specimen Warning Letter with each of the six pages showing its various components that are the primary inputs for making this invention.

FIG. 6a shows an example of the preferred embodiment of a Graphical User Interface for the user to select preferred parameter(s) to search Audio Recordings of the individual Warning Letters along with their associated text.

FIG. 6c shows the example of filtered list of results based on the user selecting two parameters to search Audio Recording of the individual Warning Letters along with their associated text.

FIG. 8a shows an example of the preferred embodiment of a Graphical User Interface for the user to select preferred parameter(s) to search Individual Citations text and their Audio Recordings.

FIG. 8d shows an example of the filtered list of results based on the user selecting three parameters and keyword.

DETAILED DESCRIPTION OF INVENTION

To help in understanding the process of making and using of the invention, first the regulatory intelligence system is disclosed which is followed by a disclosure of the detailed description of the steps involved in the processes for making the system. Examples are shown to disclose the features of the system that the users can make use of to address the information needs this invention helps to fulfill.

Every user that wishes to use the search services provided by the system is registered in the database with their credentials that are required for logging into the system. A combination of user id and a password are used for this purpose that are authenticated by the database at the time of logging in. Once the user successfully logs into the system, the user can then access different features to perform regulatory intelligence searches to help answer the specific questions that users are seeking answers for, for their specific area(s) of interest from the US FDA Warning Letters.

Figure 1:
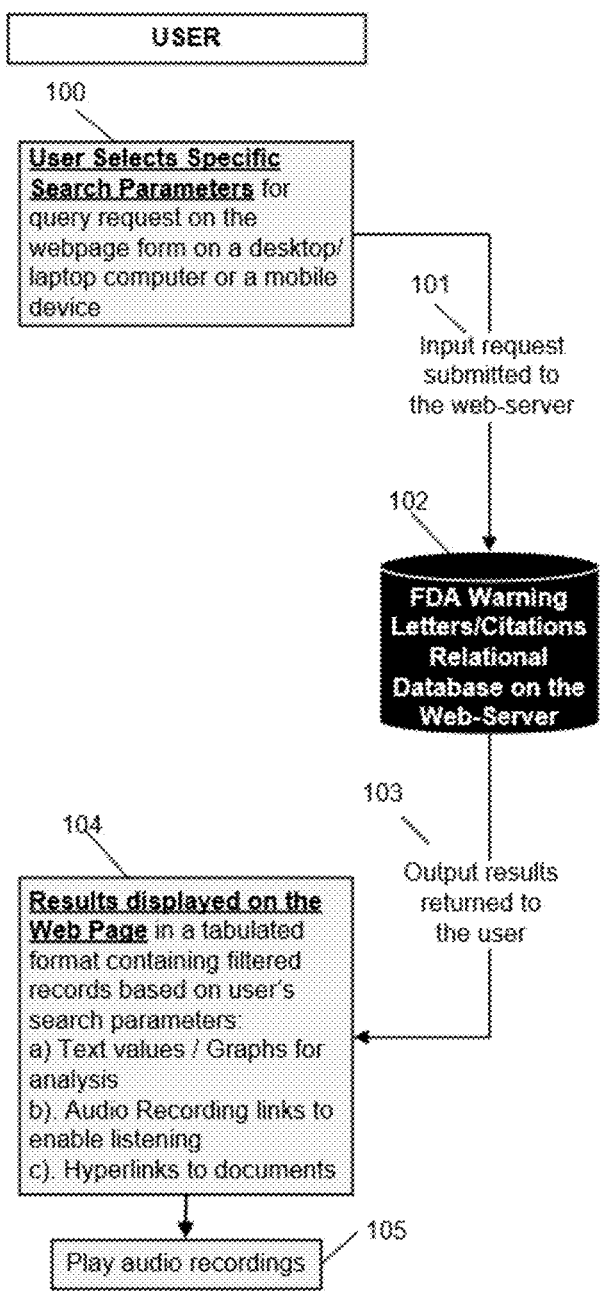
FIG. 1. shows the process of using this invention where a user can enter preferred search criteria and get a filtered list of search results from the Warning Letters/Citations database including Audio Recordings and play them on the device.

In one embodiment of the invention as shown in FIG. 1, the user can select search parameters on a web page form 100 via a desktop, laptop or a mobile device form to query the database. Once the query is submitted as an input 101 to the webserver where the regulatory intelligence database 102 is stored, the query is processed to retrieve data based on user's input criteria and the output of the query results 103 is returned from the webserver to user's computer. The query-results are displayed on the user's webpage on the computing device in a tabulated and/or graphical format. The displayed results contain a filtered listing of records 104 that are based on the search parameters that the user had submitted. The tabulated records can contain text, graphs, hyperlinks to related documents for each record (e.g. link to the specified FDA Guidance for Industry, Full-Text Warning Letter), and/or links to audio player to play the Audio Recordings (e.g. Audio Recording of Individual Citations across various Warning Letters based on user's search criteria or Audio Recordings of contents of individual Warning Letters containing all citations for a single warnings).

The information displayed to the user can be used to (a) study key metrics and trends (b) perform business analysis (c) create checklists to perform gap analyses and risk assessment of company's/user's own systems versus what US FDA is citing for other companies in their Warning Letters e.g. manufacturers of Finished Pharmaceuticals of Oral Product Type like tablets, capsules (d) play and listen to the Audio Recordings of the filtered list of citations across multiple Warning Letters e.g. only citations that apply to Laboratory Control System for Oral Product Type or (e) listen to the Audio Recording of the contents of an individual Warning Letter. The user can also print the records that are displayed on the webpage.

As described in the background section, because the existing sources provide users with information that is organized only at the level of 'full-text Warning Letters' (and not the Individual Citation level), there are limitations and shortcomings associated with them: (i) they do not provide search capabilities of Warning Letters at the granularity level of Individual Citation (e.g. to get a filtered list of Individual Citations based on user's specific needs); (ii) there is no provision provided to listen to either the Warning Letter Audio Recordings (iii) or the Audio Recordings of the individual citations that could be custom-selected across multiple Warning Letters based on user's preferred parameters; (iv) because the citations have not been isolated from the Warning Letters at the individual level, the benefits from any classification based on which Individual Citations could be meaningfully searched is not available e.g. classification based on System name, FDA Guidance for Industry, 21 CFR Part referred); (v) while full-text Warning Letters are available, there are no sources that have sub-categorized or sub-classified by Product Type and organized into a searchable database to make it more meaningful for industry professionals to zero-in on the information that matters most to them; (vi) because of lack of classification based on Product Type, the searches on Individual Citation level cannot be performed. These shortcomings make the existing sources deficient in fulfilling the regulatory intelligence needs that the users seek from the Warning Letters for their specific business interest. As shown later with examples, this invention addresses those specific unmet regulatory intelligence needs of the users by overcoming the limitations stated above.

Figure 2:
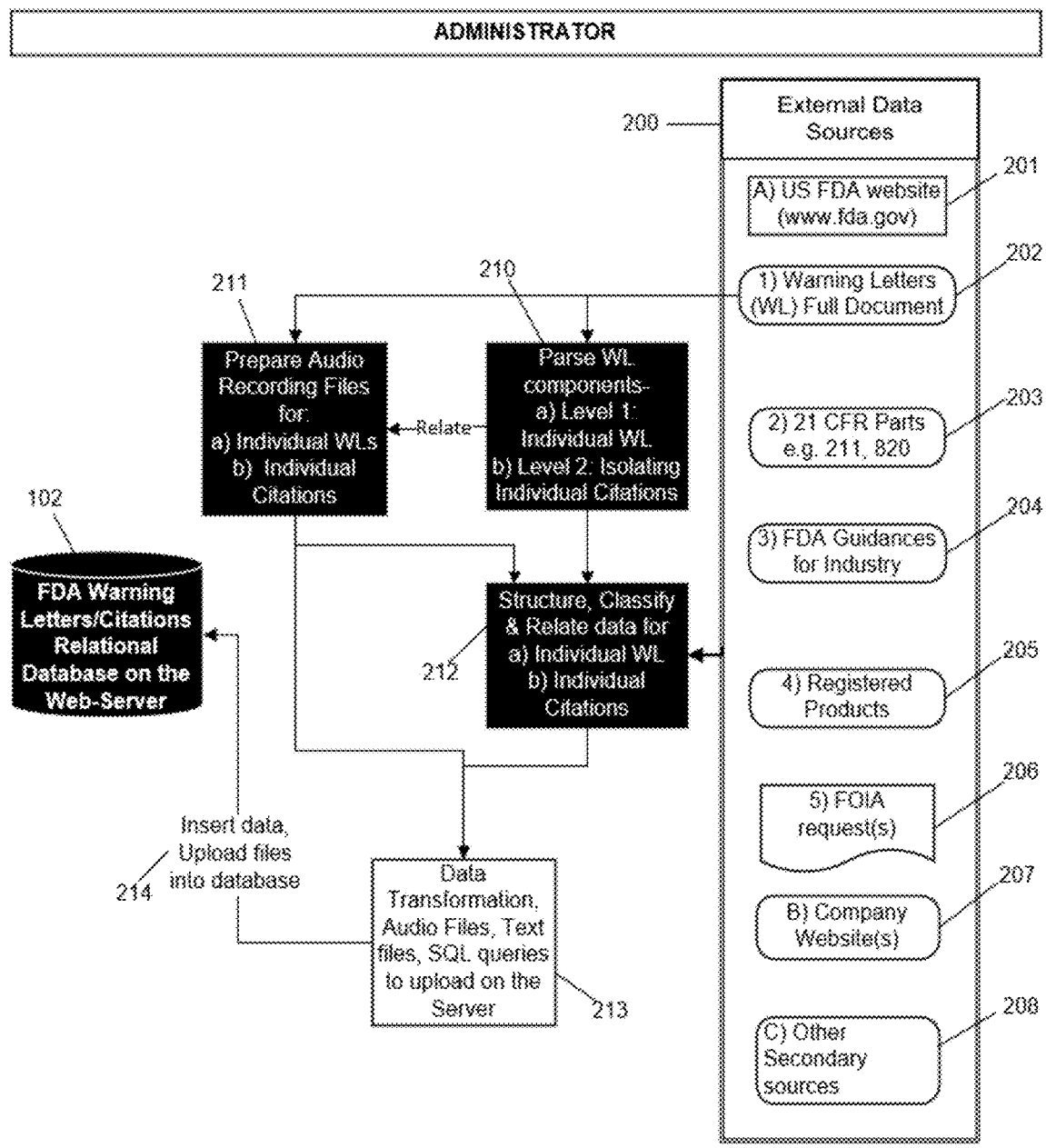
FIG. 2. shows the process flow diagram for making the preferred embodiment of the US FDA Warning Letters and Citations database.

We now describe the steps involved in making this invention so that any person of ordinary skill in this area could make and use the invention without extensive experimentation. The main components and processing steps that are used in making this invention are illustrated in FIG. 2. These steps collectively represent the tasks performed by the 'administrator' to enable the making of this invention. The following explains how the existing inputs from External Data Sources 200 are taken and processed in novel ways 210, 211 & 212 to make this Warning Letters Citations database 102 that the user can perform searches on to fulfill their unmet regulatory intelligence informational needs.

To distinguish this invention from other inventions, steps 210, 211 and 212 that are shown in the rectangular boxes with white-color text against a black-background are the main differentiating components which result into a novel Warning Letters Citations searchable relational database. The other components of the system and the steps shown in FIG. 2 are existing sources and processing methods.

In step 210 inputs are taken from External Data Sources 200 such as the Full Warning Letter document 202. Components of the Warning Letter that are relevant for this invention are parsed out and isolated from each Warning Letter and for the Individual Citations associated with it. Details related to specific components are described in the forthcoming paragraphs along with illustrations (FIG. 6a-f for Warning Letter).

In step 211, the Audio Recordings of the Individual Warning Letter as well as the Individual Citations isolated from its corresponding Warning Letter are created, edited and finalized into a file format (e.g. mp3).

In step 212 the Components from step 210 are classified based on the values they represent whose format would fit well with the structure of the database e.g. the date when Warning Letter was issued would be classified as a 'Date' whose format would match a field in the database that will correspond to a specific date-format. Similarly, the names of the firm to which the Warning Letter is issued, will go into a field in the database that accepts the text values of a certain limit of characters and classified into the "FirmName" field. The Components from step 210 and the Audio Recordings from step 211 are indexed and organized in way that they maintain their relationship with each other e.g. Audio Recording file of specific Warning Letter or Individual Citation must relate to its indexed Warning Letter or indexed Individual Citation and other associated components.

In step 213, the data such as the text of an Individual Citation or a hyperlink to an audio file is transformed in a way that it appears on the webpage in a desired presentable format (e.g. by using html tags) for a user to conveniently read the text, or display an audio player where a user can click the play button to listen to an audio recording. The text files (e.g. Warning Letter documents) and Audio files, which comprise other elements of the system are then readied to be uploaded on the webserver 102. The files and the transformed data of the components required for building the invention are then uploaded 214 on to the webserver 102 via the use of Structured Query Language (SQL) for insertions into the database and via direct upload of text documents and audio files.

The webserver 102 houses the structured relational database that contains all the data on the Warning Letters and Individual Citations that has been prepared and organized in the steps described above and inserted into the database that the user can access. To serve the user's query requests like any typical webserver, the webserver includes the code that allows users to interact with the database for performing searches. Details of what components are parsed for processing at the Warning Letter level and at the Individual Citation level are described separately along with illustrations (FIG. 5 and FIG. 7a-b) in the forthcoming paragraphs.

Figure 3:
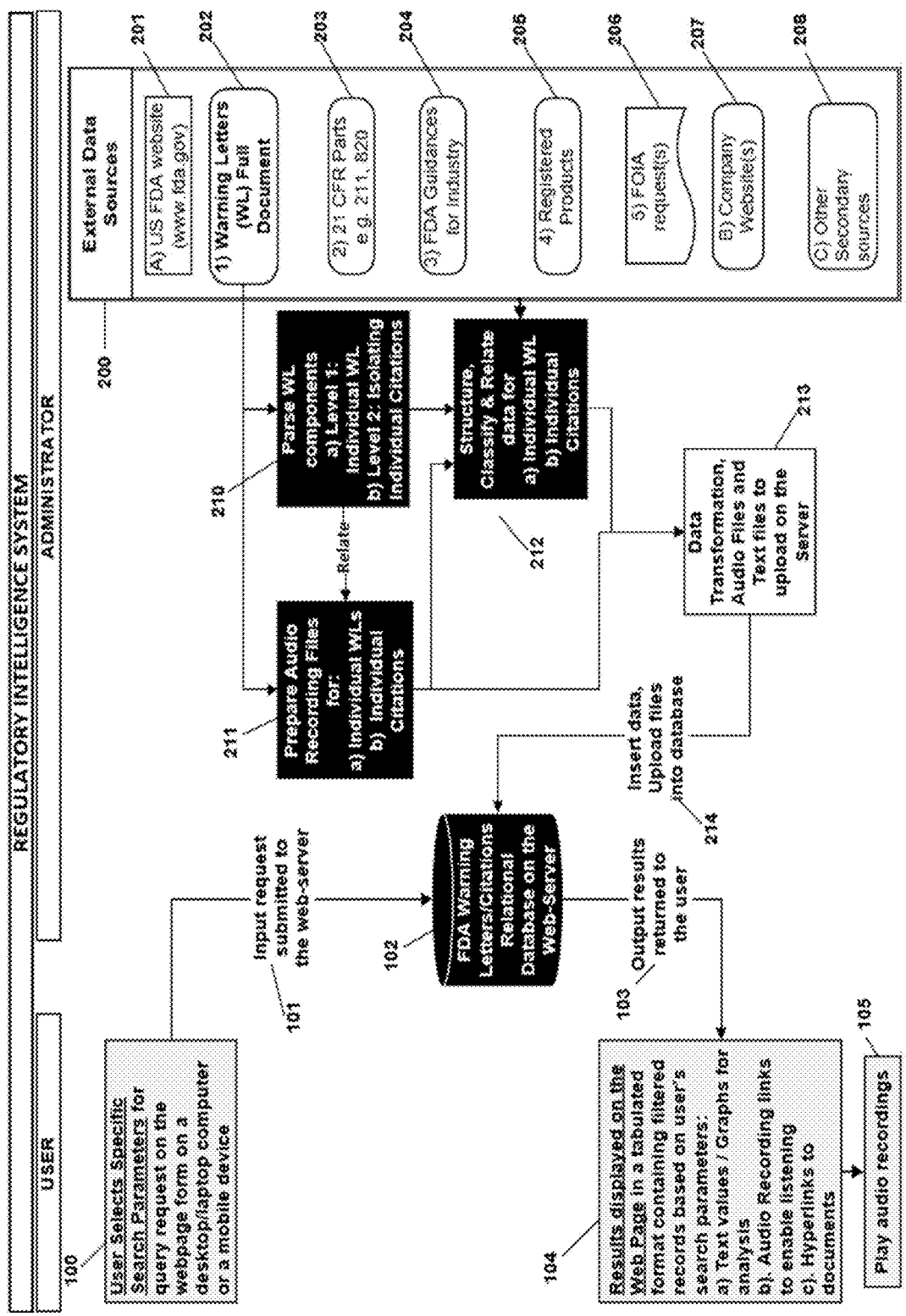
FIG. 3. is the preferred embodiment of this invention which shows the integration of the processes for making and using the invention to form regulatory intelligence system for US FDA Warning Letters and Citations.

FIG. 3 shows the integration of the methods of making the invention as shown in FIG. 2 with the process of using the invention as shown in FIG. 1 to form an integrated regulatory intelligence system which allows users to select their preferred parameters to perform filtered searches in multiple ways on US FDA Warning Letters and Individual Citations while enabling them to receive such information in audio recorded format for listening in addition to the text format for reading.

The initial inputs to the invention are obtained from multiple external data sources 200 that currently exist. US FDA website 201 is a publicly accessible website where the following key components relevant to this invention are published: 1) Warning Letters 202; 2) Federal Regulations related to FD&C Act comprising different 21 CFR Parts (e.g. Parts 211, 820) 203 that the different types of categories that products fall into are required to comply with. These regulations can also be accessed from other US Federal Government websites and several other law-related websites; 3) FDA Guidances for Industry 204, which lay down concepts and frameworks based on which firms can build their systems and operations to achieve regulatory compliance; and 4) Listing of FDA Registered Products 205 by various firms. There are several types of documents that FDA does not publish on its website, however they can be requested by public from FDA's Freedom of Information (FOI) Office 206 for a fee. For the purpose of this invention such documents would include the ones that are pertinent to the context of Warning Letters (e.g. FDA Form 483s, List of companies inspected and investigators names). FDA Forms 483 are also a source that contains the names of Investigators that performed the inspection as stated earlier.

The Warning Letters are posted routinely (almost on a weekly basis) by the FDA at their website for public information. As stated before, there are various Categories of Warning Letters such as: Food articles, Tobacco, Medical Devices, Finished Pharmaceuticals, Active Pharmaceutical Ingredients (APIs), Pharmacy, Dietary Supplements, Clinical Investigator, Advertising & Marketing, Veterinary products, etc. that are issued by various offices of FDA. One category of Warning Letters pertains to violations and deviations related to Current Good Manufacturing Practice (CGMP) requirements. There are different sets of CGMP regulations (or requirements) that apply to Food articles, Medical Devices, Finished Pharmaceuticals, APIs. For each of these categories, their CGMPs are codified in specific Federal Regulations e.g. 21 CFR Parts 210 and 211 for Finished Pharmaceuticals, 21 CFR Part 820 for Medical Devices, 21 CFR 111 for Foods, 21 CFR 606 for Biologics, 21 CFR 225 for Veterinary Medicine, 21 CFR 314 for approval to market new drug, etc.

Since this invention pertains to systems and methods to get regulatory intelligence from US FDA Warning Letters, to help explain the utility of the invention, it is important to understand the various components of a typical Warning Letter. With that end in mind, a description of the various components of a typical Warning Letter is now being described in the forthcoming paragraphs along with a specimen of an FDA Warning Letter shown in FIG. 4a-f.

Although this Warning Letter is for a manufacturing facility belonging to the Category of 'Finished Pharmaceuticals' and there could be minor variations in which different FDA departments issue Warning Letters for their Category (e.g. like Food, Medical Devices, Pharmacy, Dietary Supplements), the basic concepts are similar, because the goal is to list down violations and/or deviations from FDA regulatory requirements. A Warning Letter could be divided into its components in various ways, only those components that are most relevant for the purpose of making this invention are described below.

Figure 4A:
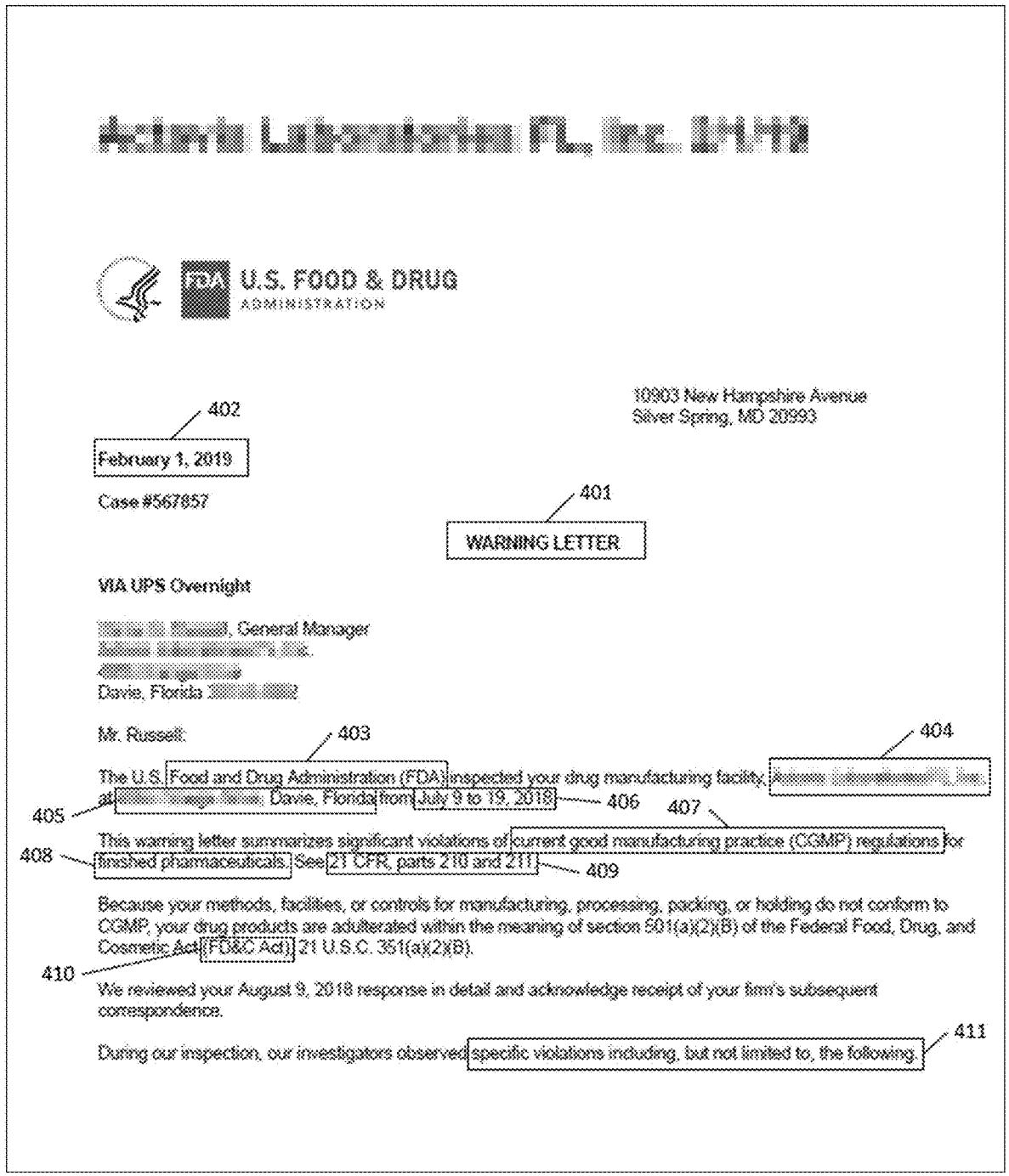

As shown in FIG. 4a, the beginning of a Warning Letter bears: the title 'Warning Letter' 401, the date on which the Warning Letter was issued 404, name of the agency name Food and Drug Administration (FDA) 403 that inspected the facility, name of the firm 404 (redacted here) that was inspected, location 405 (street address has been redacted) of the manufacturing facility that was inspected and the dates 406 during which the FDA investigators performed inspection and then issued FDA Form 483 to the company at the end of their inspection. Based on the type of regulatory requirements that were observed to be violated, the letter states those regulations, which in this case are 'current good manufacturing practice (CGMP)' 407 for the specific Category 'Finished Pharmaceuticals' 408. Then the reference to the Code of Federal Regulations where these CGMPs are stated, which in this case is '21 CFR Parts 210 and 211' 409. This (21 CFR Parts 210 and 211) is where the CGMP regulations for Finished Pharmaceuticals are codified as legal requirements to which the Pharmaceutical Manufacturers must comply with, in order to market their products in USA. The reference to the legal Act that is relevant in this case 'FD&C Act' 410 and the associated section is also provided. The Warning Letter then provides the statement around the fact that the specific violations that are written in this Warning Letter (on subsequent pages) are the ones that the investigators observed 411 but the violations are not limited to those that are stated in this Warning Letter. (A Form 483 that generally precedes a Warning Letter may contain many more inspectional findings, not all of which may be included in the Warning Letter.)

Figure 4B:
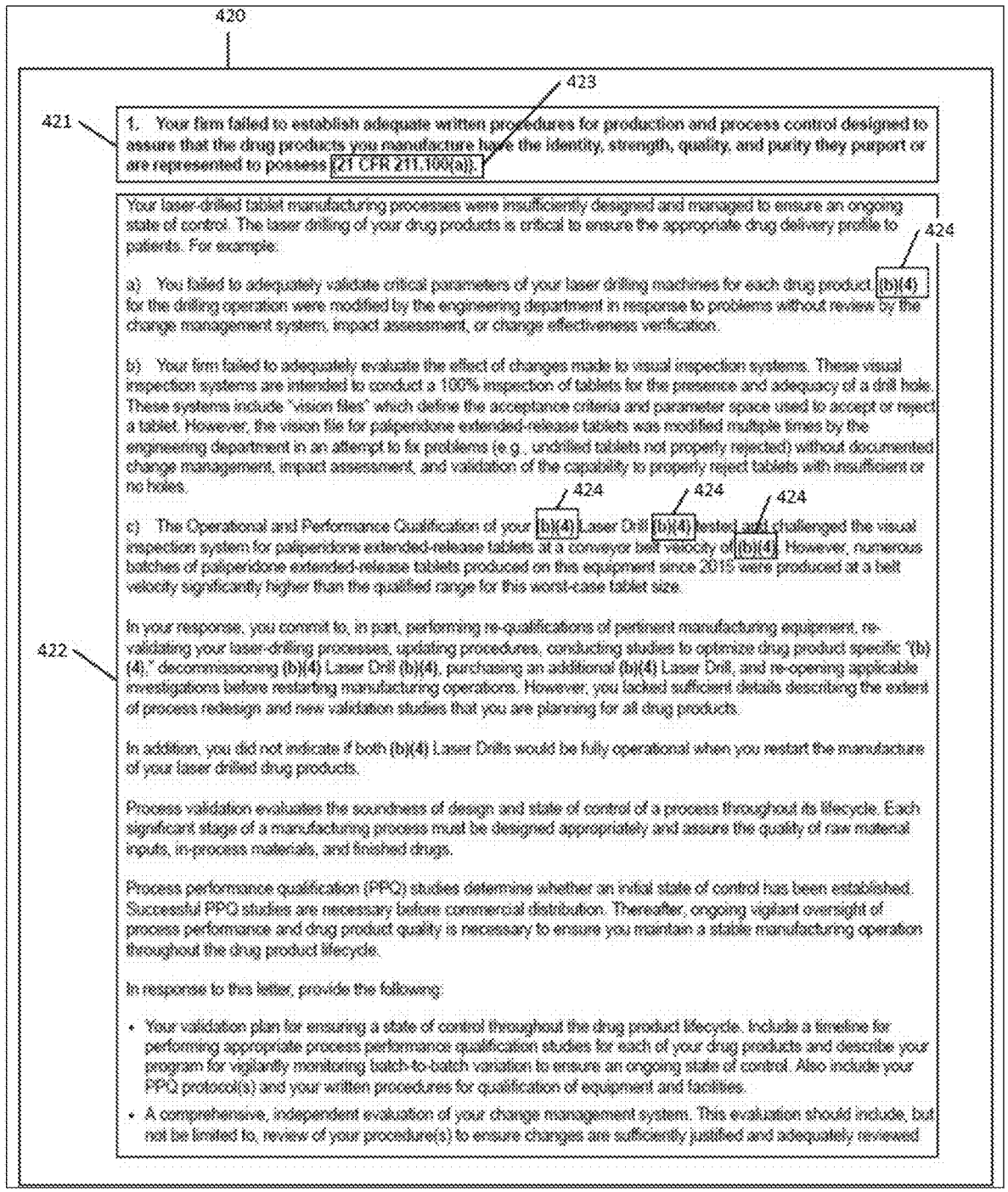

FIG. 4b lists the first violation (# '1') 420. A violation generally comprises two parts: Part one 421 is the description of the violation as it pertains to a requirements against a specific section of the CFR; this part can also contain the reference number of the section that mandates the regulatory requirement which in this case is '21 CFR 211.100(a)' denoted by 423. Part two of the violation 422 contains the supporting facts and details based on which the FDA made the determination of violation. Any text that FDA deems that it remains confidential is redacted and the redacted parts are represented by '(b)(4)' as shown in 424. An example of text that is generally redacted in the Warning Letters and therefore restricted from public access is the name(s) of drug product(s) manufactured at a facility or a named equipment. Not having visibility about the explicit product details makes it difficult for a user to get regulatory intelligence information for the Product Type of his/her own interest, and then organize such information across a multitude of Warning Letters and enable meaningful searches to perform specific regulatory analysis. It requires more than an ordinary skill at times to dig into multiple other sources of information to determine the Product Type classification (e.g. Oral, Topical or Sterile) of the 'Finished Pharmaceutical' for which the Warning Letter has been issued. As shown in FIG. 3, those other sources could include listing of 'Registered Products' 205 at the FDA website, or researching the Company website(s) 207, and other secondary sources 208 for shipping data. If requested, for reasons of confidentiality the FDA FOI Office does not reveal the information on Product Type to the general public.

Like the violation '1' described above that continues on FIG. 4c (page 2 of 6 of the Warning Letter Specimen), FIG. 4c lists the second violation 430, the description of the violation 431, the CFR reference 433 and supporting details 432. Redacted texts 424 are also represented. This is followed by another violation 435 number '3', its description 436, CFR reference 438 and supporting details 437.

FIG. 4d continues violation '3' from above and shows examples of more redacted text 424, another violation 440 number '4' like the previous three violations. FIG. 4e shows continuation of violation '4' that has some more examples of redacted text 424.

So, this Warning Letter has four violations that are numbered (from 1 through 4). In the section shown in 461 the Agency is referring the firm to see FDA's guidance document 462. In 463, the Agency is also making a recommendation to the firm. FIG. 4f shows the last page of the Warning Letter to provide the reader a complete picture of the contents in a full Warning Letter.

In all, there are four violations in this Warning Letter, and a couple of recommendations. For the purpose of this invention, we are using the term 'Citation' to represent 'violations', 'recommendations' as well as the term 'deviations' which may be used in certain other Warning Letters by the Agency. One Category of Warning Letters where the term "deviations" is frequently used is for APIs (in such Warning Letters a reference to a specific 21 CFR Part is generally not provided in the Citation). Although majority of the Warning Letters contain about four citations, the number of citations in a single Warning Letter can typically range from one to eight.

Having explained the components of the Warning Letter which provide important inputs to developing this regulatory intelligence system, the process of making two main embodiments of the invention will now be explained. One embodiment is for the user to get regulatory intelligence information at the level of 'Individual Warning Letters' called 'Level 1' for the purpose of this invention, and the other embodiment is for the user to get regulatory intelligence information at the level of Individual Citations called 'Level 2'. Level 1 is focused on the Full Warning Letter singularly. Level 2 is focused on the Individual Citations that are derived or isolated from the Warning Letters and pooled together to enable searches at that level. As described earlier, a single Warning Letter has multiple citations. So, in that sense, the full Warning Letter could be viewed as a 'Parent', whereas the multiple Citations that it contains, could be viewed as the 'Children' of the Parent Warning Letter. In the sections that follow, first, the making and use of Level 1 of the invention (Warning Letter at its Individual level) is described, followed by the description of making and use of Level 2 (Individual Citation Level) of the invention.

Figure 5:
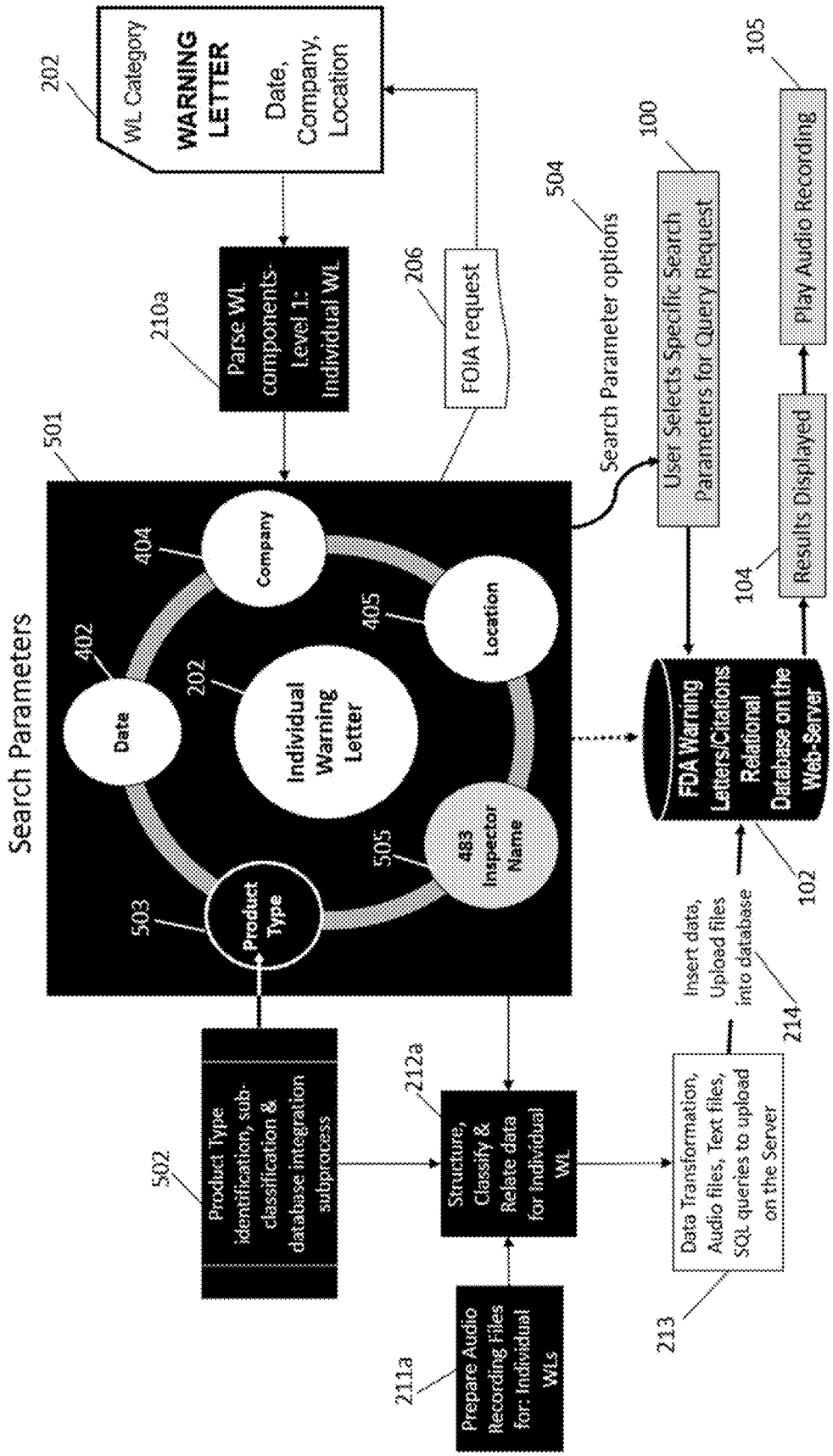
FIG. 5 shows the process of making the Level 1 of this invention that pertains to the Individual Warning Letters searches including their Audio Recordings whereby the user can select specific parameters to get a filtered list to play Audio Recordings of Warning Letter contents and analyze results.

In FIG. 5, step 210a relates to parsing different components of the Warning Letter (WL) at Level 1, the individual WL level. From a Category (e.g. Finished Pharmaceuticals) of Warning Letters, the information about each Warning Letter is classified and structured based on the following parameters that are parsed from the Warning Letter: (1) 'Date' of issuance 402 (FIG. 4a), (2) 'Company' name 404 (FIG. 4a), (3) 'Country' (or City) from the Location Address 405 (FIG. 4a) and (4) As mentioned earlier, the FDA Form 483 which generally precedes the issuance of a Warning Letter, contains the names of the FDA Inspectors. The names of those inspectors that were involved in issuing the FDA Form 483 based on which the Warning Letter was issued, are used for linking the Warning Letter with the corresponding inspectors.

Refer to FIG. 5 which illustrates the various 'Search Parameters' 501. The four parameters listed above constitute some parts of the search criteria that the user will have available as part of this invention to perform searches on the Warning Letters. A more detailed description of FIG. 5 follows in the sections below.

As shared above, on the FDA website the Warning Letters can be searched for their full text (e.g. as html webpages). For the purpose of this invention, the first two of the four parameters stated above, namely the 'Date' 402 and 'Company' name 404 are the parameters based on which the users can search individual Warning Letters in their 'text' format on the US FDA website. Another private source (fdazilla.com) provides on their website additional capability (free) to search the individual Warning Letters based on the location of the company and the 483-inspector name that presents full text of the Warning Letter.

Unmet Need. (1) At present there is no source that users could use to access the audio-recorded versions of the individual Warning Letter contents. This mode of access would make it more convenient for users to receive the information in the Warning Letter, there by maximizing the user of their time and enhance productivity. This invention fills this gap by making available the Audio Recordings of the Warning Letters available to the users. This invention also provides users the capabilities to search Audio Recordings of the Warning Letters based on any one or any combination of these parameters namely, user's preferred date-range, company name, location (Country) and/or 483-inspector name. (2) As described before, since a large number of companies are organizationally structured based on the 'Product Type' that is manufactured their facility (or their Operation type, the term used interchangeably), it will be more meaningful if the users could search the individual Warning Letters for a specific Category (e.g. Finished Pharmaceuticals) based on the sub-classification of the Category into the appropriate 'Product Type'. This need is not fulfilled by other sources referred in the description earlier. This invention provides a method wherein the Warning Letters for the specific Category are further sub-classified into their 'Product Type' (e.g. Oral, Topical or Sterile Product Type for Finished Pharmaceutical Category).

What follows now is a disclosure of the method to make searchable Audio Recordings of individual Warning Letters that the users can access via their computing device and play them to listen from a filtered list of Audio Recordings of the individual Warning Letters based on their preferred search criteria. To accomplish this what is required are the following: (a) relevant criteria based on which the user can perform searches to get the Audio Recordings users wants; (b) the Audio Recording version itself of the individual Warning Letter contents that the user can play and listen to; (c) relating the search criteria with the corresponding Audio Recording files; (d) having these integrated in a searchable database for the user to be able to find what the user is looking for. The flow diagram in FIG. 5 provides the main steps of the process used to accomplish these goals. The process starts with the initial input components taken from the Warning Letters 202 that will become part of the search criteria for the user. These are (1) Date 402, (2) Company 404 and (3) Location 405

For a single Category of Warning Letters, these components are parsed from the Individual Warning Letter (Level 1) i.e. each of these components is isolated by copying their values from their respective Warning Letter and placing them in a format that is structured 212 to represent their corresponding parameters (also called field name in the database parlance). For example: the value 402 "Feb. 1, 2019" would be placed in a "Date" field in the database that stores such values as 402 for a pool of Warning Letters. However, the sub-process of taking the values of different components from a Warning Letter 210a, structuring and relating them 212a and getting them into a relational database on the webserver 102 requires 'Data transformation' 213. As described above the data transformation step entails: one, the conversion of these values into a format to appropriately represent the type of field (e.g. Date, text, integer, etc.) that they need to be stored in, and two, for these values to be marked up in a way that they get displayed properly in a webpage when this data is retrieved by the user. For data transformation, this invention uses a combination of standard spreadsheet application, manual editing and tagging of the text in a markup language (HTML).

Another component the 483-inspector name(s) are acquired based on responses received to the requests made to FDA FOI Office under the FOI Act. These four components (Date, Company, Location and 483-inspector name) which represent the parameters that a user can perform searches related to Warning Letters, are available from information published by FDA for public access or the FDA FOI Office. These parameters are represented by the four circles with white/light background and black fonts in box 501 of FIG. 5.

As part of this invention another parameter 'Product Type' is added to enable more meaningful searches as described earlier. This parameter is a sub-classification of the Category of the Warning Letter, that is not explicitly provided by FDA. Generally, references to 'Product Type' are redacted. In order to determine 'Product Type', reference to other sources like company websites, registered product list, making professional judgement based on the read-out of the Warning Letter, reviewing registered product listing on the FDA website, company webpages or other related documentation may be required. After taking these measures and determining the 'Product Type', each Warning Letter is then sub-classified by 'Product Type'. The values of the Product Type are indexed in the database to enable their relationship with the other components of the Warning Letters. Once a multitude of Warning Letters are classified based on their 'Product Type', a pool of Warning Letter and the associated information on its components in the database now becomes available to the users to perform custom searches for their specific Product Type of interest, and also analyze aggregate trends and metrics based on 'Product Type'. This parameter makes for another search criterion and is represented by circle 503 'Product Type' that is integrated with the other parameters for a given Warning Letter and is shown with black background and white fonts in FIG. 5 to represent how this is differentiated from others that are shown in white/light circles with black text. Therefore, the structure of search parameters to perform searches at the Warning Letter level comprises at least these five parameters as shown 501 as part of this invention.

In another step 211a the Audio Recording files for individual Warning Letter are prepared separately. The initial recording is followed by editing, cleaning and getting the audio file in its presentable form using a standard audio creating and editing software and microphone. The audio file attributes and the five parameters pertaining to an individual Warning Letter which help classify the Warning Letter are then related to each other 212a. The text file of the Warning Letter in pdf is created, structured and is also related to the Warning Letter components to be uploaded on the server 213. All these outputs are then uploaded 214 and integrated in the relational database 102 on the webserver via SQL queries and direct uploads of the audio and text files on the back end. As a result, a single topic record is created for each Warning Letter that is related with its corresponding Product Type 503, 483 inspector name 505, Country 405, Company 404, Date of Warning Letter 402, link to Audio Recording (e.g. 619 in example shown in FIG. 6b, FIG. 6b example explained in more detail later), link to full-text pdf document (e.g. 623 in FIG. 6b) in a structured database. At the front-end a user-interface allows user to submit query requests 100 via a computing device (e.g. laptop, desktop, mobile device) to retrieve results based on user's preferred search criteria 504 on the front-end, which are displayed on the user's screen, including the link to the Audio Recording of the Warning Letter. The user can then play the Audio Recording 105 and listen.

Figure 6A:
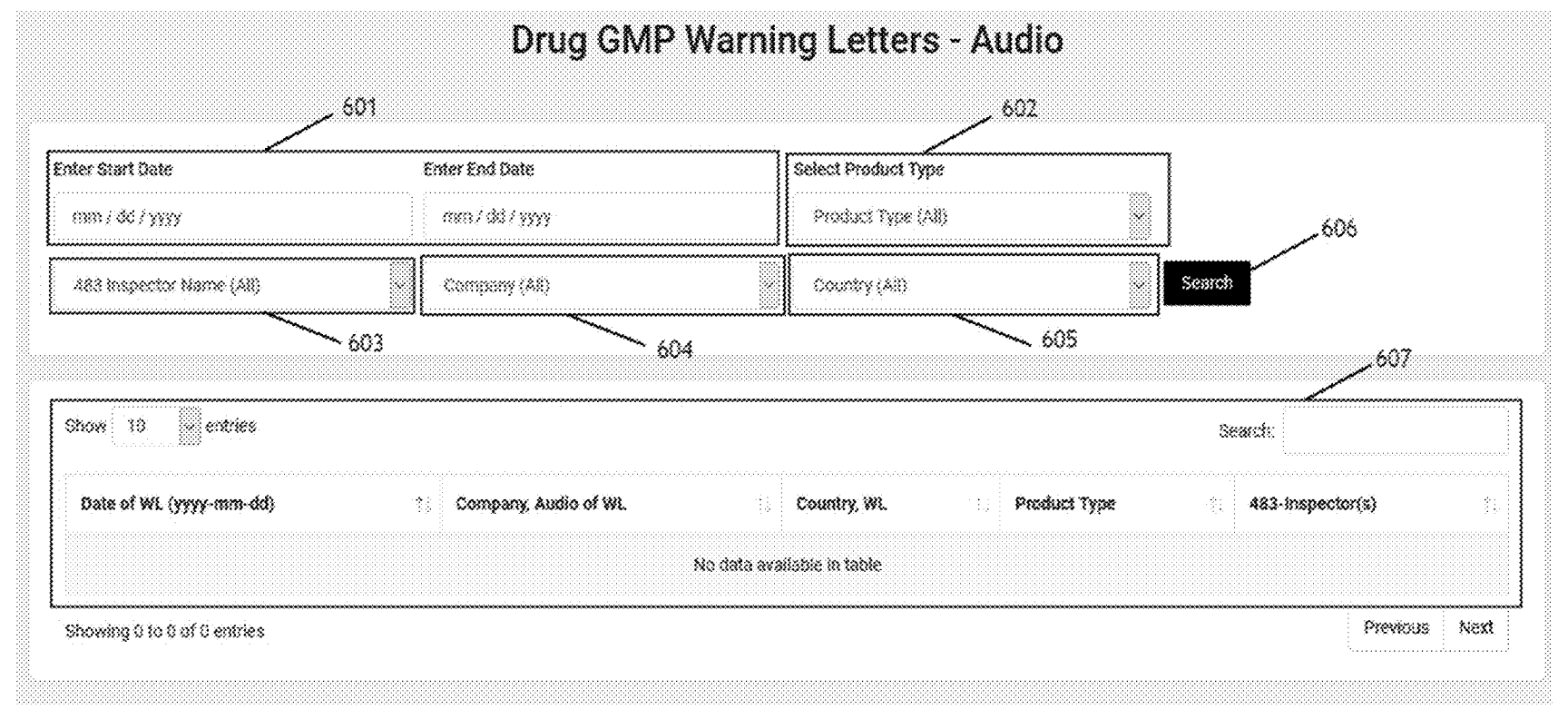

For a user to retrieve the Audio Recording(s) of the individual Warning Letter(s) from the database based on specific parameters, the system provides a webpage GUI that works in the web-browser for user interaction. FIG. 6a is an illustration of the GUI for the user to perform searches of Audio Recordings and full text of individual Drug GMP Warning Letters. At the top of the webpage is a form which lists five parameters that have drop down menu options associated with each one of the parameters. These parameters are: (1) Date range 601 which has two parts, the start date and end date. (2) Product Type 602: e.g. Oral, Topical or Sterile Finished Dosage Forms or Active Pharmaceutical Ingredients (APIs). (3) 483 Inspector Name 603 (4) Company 604 and (5) Country 605. When a user clicks into each one of these fields, a list of values shows up in the drop-down menu. The user can select anyone of the values from the drop-down values for each one of the parameters. Then the user clicks the "Search" button 606 to submit the query request. The results of the query will be displayed in the table area 607. If the user hits the "Search" button 606 without selecting any criteria, then all the records from the database are displayed by default. For example, if no specific date range is selected then the default value is all the dates in the database for the Warning Letters. The suffix "(All)" noted at the end of the parameter name in 602 through 605 indicates that if the user does not select a specific value from the drop down values, then all values for those parameters will be considered as part of query submission and retrieval of records from the database.

Figure 6B:
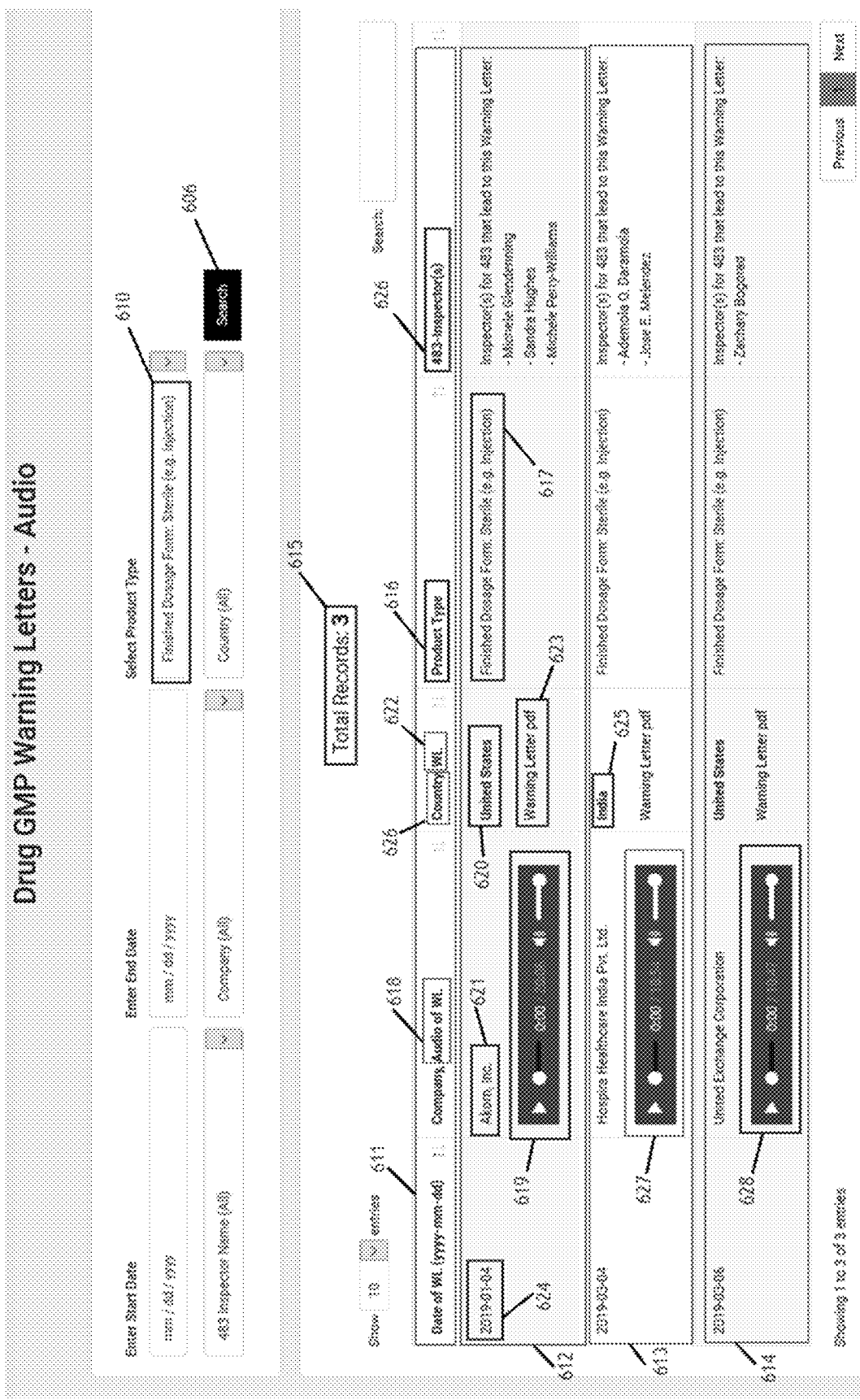
FIG. 6b shows the example of filtered list of results based on the user selecting one parameter to search Audio Recording of the individual Warning Letters along with their associated text.
Figure 6C:
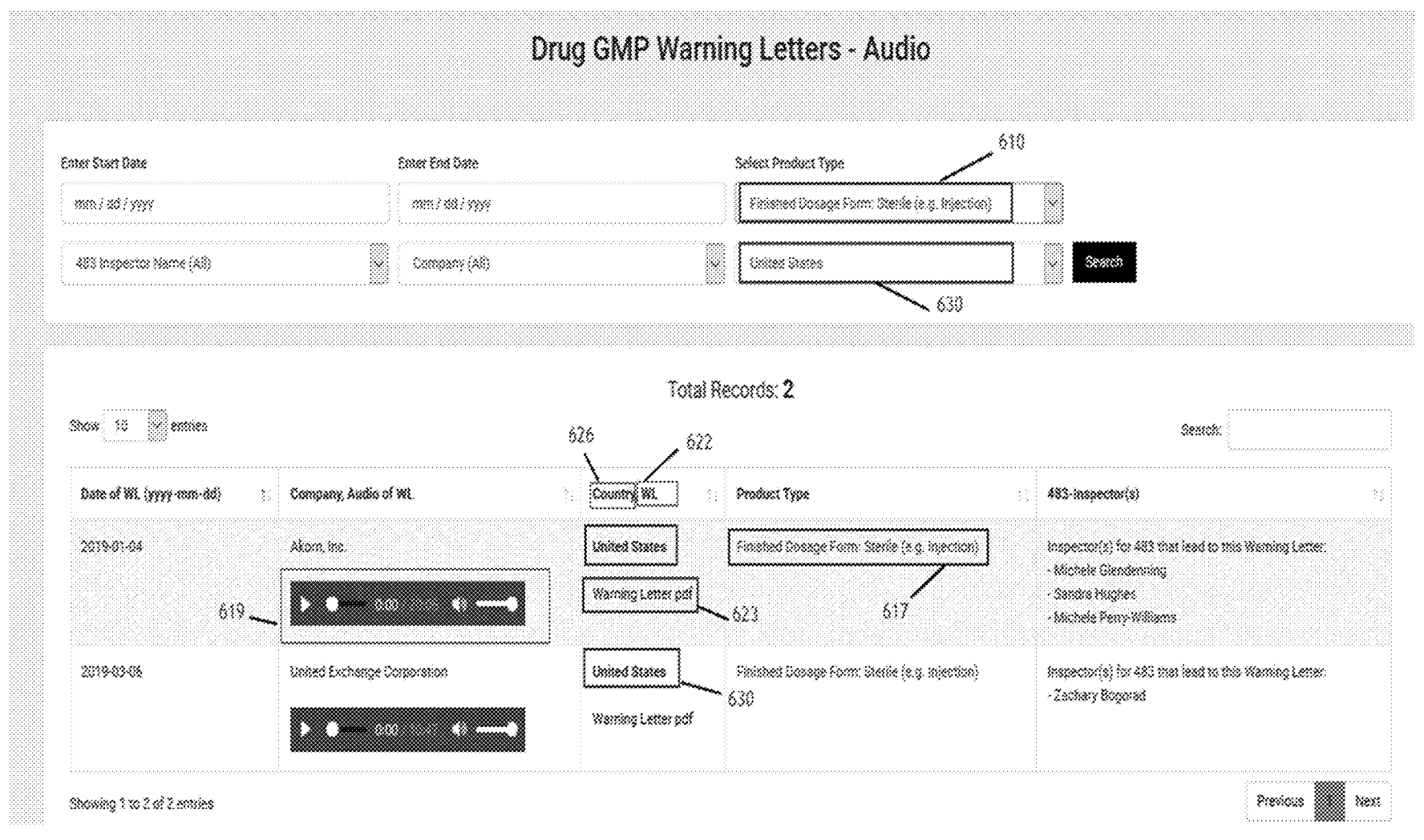

Example of the using this GUI by a user to get the filtered list of records on a webpage based on user's preferred inputs by selecting a single parameter are illustrated in FIG. 6b and FIG. 6c. The primary purpose of the examples that follow below is to show the placeholders where the different contents of the results appears on the webpage to help the reader understand the functionality of the invention, and not on the actual content of the text which is only exemplary.

In the example shown in FIG. 6b, the user pulls the drop-down menu for the 'Product Type' parameter and selects "Finished Dosage Form: Sterile (e.g. Injection)" 610 as a single parameter based to perform his/her preferred search and then clicks the 'Search' button 606 to submit the query to the webserver. On the webserver, the query is processed based on the query parameters received and outputs the result records 103 back to the user's computer's web-browser. The results of the query which comprise a filtered list of records based on the user-selected parameters, are displayed on the user's webpage as a tabulated listing of multiple rows of single topic records. This table is shown in the lower part of FIG. 6b, which contains a table header 611 below which are the output records from the database. In this case, the Product Type name is displayed in 617 that corresponds to user selected parameter "Finished Dosage Form: Sterile (e.g. Injection)" under the heading 616 for the Product Type for all subsequent records. There are three records in the database that are represented by rows 612, 613 and 614. In the first record, 621 represents the 'Company' name to which the Warning Letter was issued, below which is the image of an audio player 619. By clicking the 'Play' button here on user's computer or mobile device screen, the user can start to listen to the Audio Recording of the contents of the Warning Letter issued to this company. The Audio Recordings of the other two Warning Letters are correspondingly displayed 627, 628 in the next two rows. The next column under the Country heading 626 shows the Country name where the company is located 620 "United States" in this case. Below the Country name is the hyperlink to the full text of the Warning Letter 623 as a pdf document. Upon clicking this link, the pdf document opens will open a new window in the browser displaying the full text of the Warning letter, an example of which has been previous shown in FIG. 4a-f. The first column shows the Date of Warning Letter issuance 624. The last column of the table contains the values of the names of 483-Inspectors under the heading for their corresponding record 626. Similarly, the second record 613 is for another Warning Letter based on the user's search criteria, and in this case Country location is "India" 625. This is an example where the user chose a specific value "Finished Dosage Form: Sterile (e.g. Injection)" for a single parameter, namely "Product Type" and was able to retrieve the audio recording(s) as well as full text of Individual Warning Letter(s). We will now see another example which will show that the user can filter this listing further by combining any two (or more) parameters.

Figure 4C:
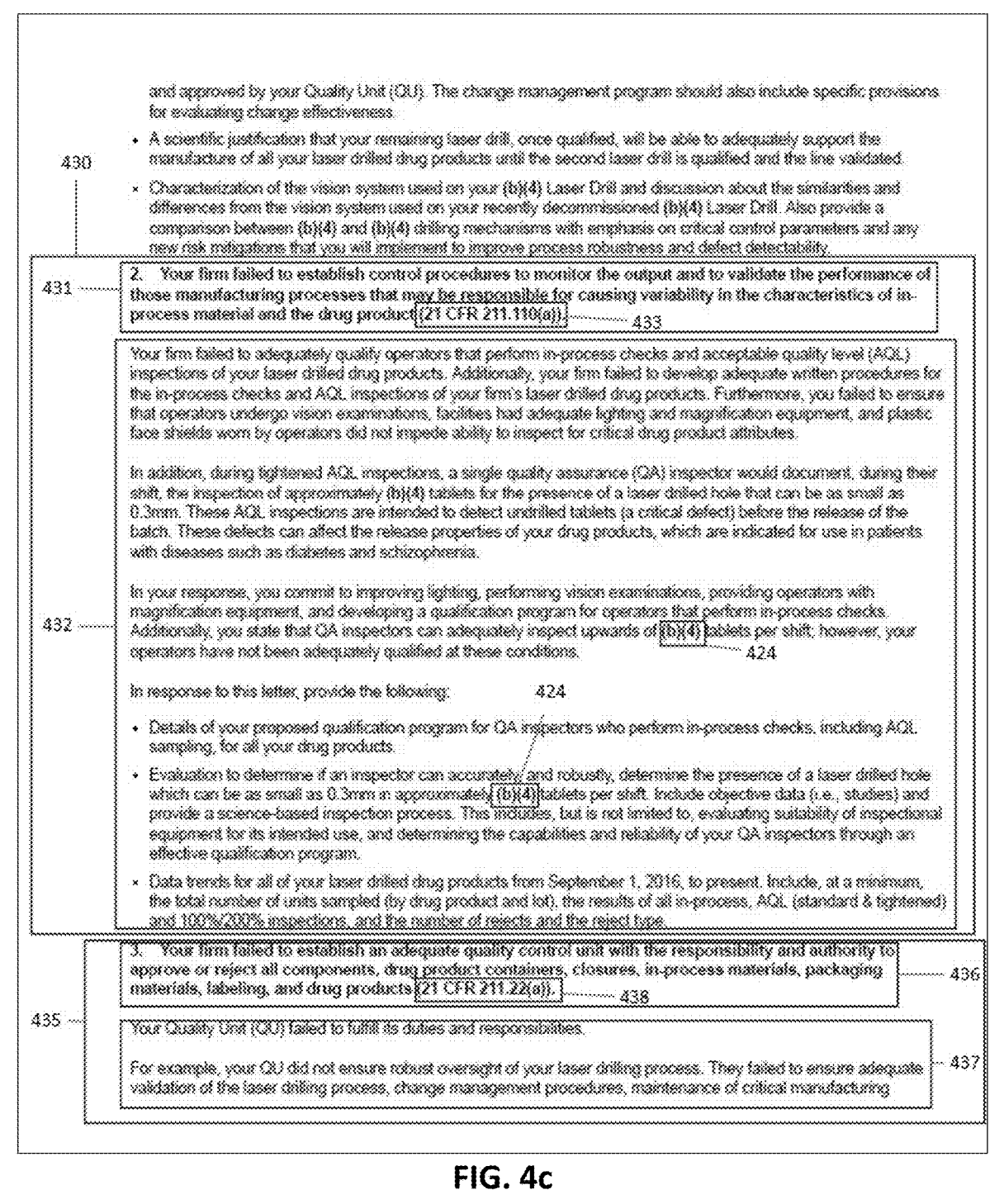

We will combine the search parameter Product Type as selected in FIG. 4b "Finished Dosage Form: Sterile (e.g. Injection)" in combination with a second parameter "Country" (605, FIG. 6a) where the specific value for the "Country" being "United States". As illustrated in FIG. 6c, based on the combination of values for the two parameters 'Product Type' as "Finished Dosage Form: Sterile (e.g. Injection)" 610 and Country "United States" 630, the output displayed now contains only two records for "United States" under the heading 626 for Country. It does not contain the third record for "India" as was in the previous example illustrated in FIG. 4b showing that it has been filtered out based on user's new search criteria for Country being "United States". All other elements for each record are also shown in FIG. 4c thus enabling the user to get a customized filtered listing of the records to either listen to the Audio Recording or study the full text version of a Warning Letter. Such a system fulfills the unmet need of searching Warning Letters by Product Type and/or any other combination of the multiple parameters listed above for retrieving audio and text versions of the individual Warning Letters.

Individual Citations. In FIG. 2. step 210b relates to parsing Warning Letter for isolating Individual Citations. The subject of this section focuses on the main components of an Individual Citation which lead to the formation of search parameters for this invention. As described earlier, each Citation (e.g. 430 in FIG. 4c) has two parts, the description 431 and supporting details 432. The description 431 generally references a specific (1) "21 CFR" section. The citations may also contain reference to one or more (2) "FDA Guidance for Industry" (e.g. 462 in FIG. 4e). These two elements are isolated from the Warning Letter by direct reference and will be the basis for building two of the several other search parameters at the Individual Citation level (Level 2) for this invention. The other parameters as part of making this invention are not obtainable by direct reference from Warning Letter. As will be explained later on making of Level 2 of this invention, the building up of other parameters requires inputs of heterogenous resources that need to be structured in the database through indexing that will be used to individually classify Individual Citation and relate to it where necessary. Such a process will allow a user to search for regulatory intelligence information at the Individual Citation level as they appear in the Warning Letters along with other relevant details as a filtered listing based on the user's preferred search criteria from a pool of Individual Citations.

Firstly, On the US FDA website, although there is limited and only partial information related to inspectional citations that the FDA uses to write their observations in the FDA Forms 483, those are limited to a few words or limited characters comprising one or two sentences. The text of the Citations in the Warning Letter is different from the inspectional findings or observations that are presented on FDA Form 483. Form 483 lists FDA inspectors' observations or inspectional findings upon initial inspection, whereas the Warning Letters contain actual "violations" based on FDA's review. Hence those inspectional citations posted at the FDA's website do not fulfill the regulatory intelligence needs that the users are seeking specifically at the Individual Citation level from the Warning Letters. Secondly, not all FDA Form 483s lead to a Warning Letter. For about every ten or so FDA 483s issued for Finished Pharmaceuticals, only one Warning Letter is issued. In terms of prioritizing the assessment of risk given the limited resources that each company has, it is more prudent to first be able to zero-in on those Citations that pose a higher risk and prioritize resources from a productivity standpoint. Warning Letters contain definitive violations and deviations, which carry a higher risk as compared to inspectional observations in FDA Form 483s. Therefore, given the limited resources, addressing Warning Letter Citations logically should take precedence over the inspectional findings in Warning Letter; not that Form 483s are not important, they certainly are, but prioritizing what is more important is always better. Thirdly, there is no source that provides search capabilities on Individual Citations that are classified in numerous ways (e.g. by Product Type or by FDA Guidance for Industry or System) and/or provides regulatory text of the 21 CFR section number that has been referred in the Warning Letter violation alongside the violation record to enable users to get regulatory intelligence in ways that are convenient, quick and meaningful. Consequently, the aggregate metrics and trends corresponding to those classification types for Individual Citations in the Warning Letters can also not be presented to the users (e.g. by Product Type or by FDA Guidance for Industry or System) because they are not classified (or categorized) at the individual level in the first place. In addition, none of them provide the functionality where the individually filtered citations can be found in an audio-recorded format that can be listened on a device even when the user is on the go. This invention provides methods to fulfill the above-mentioned unmet needs.

In order to fulfill the regulatory intelligence needs stated above at the Individual Citation level the main components required for the invention (1) isolated citations at their individual level in the text format (2) multiple parameters for different types of users to search Individual Citations that meaningfully address their specific information needs (3) audio recorded versions of Individual Citations for listening purposes, and (4) a process to classify and relate these components and integrate them into a system that enables users to retrieve filtered information customized for their use is what this invention provides. The details of the method of making this invention is described below.

Figure 7A:
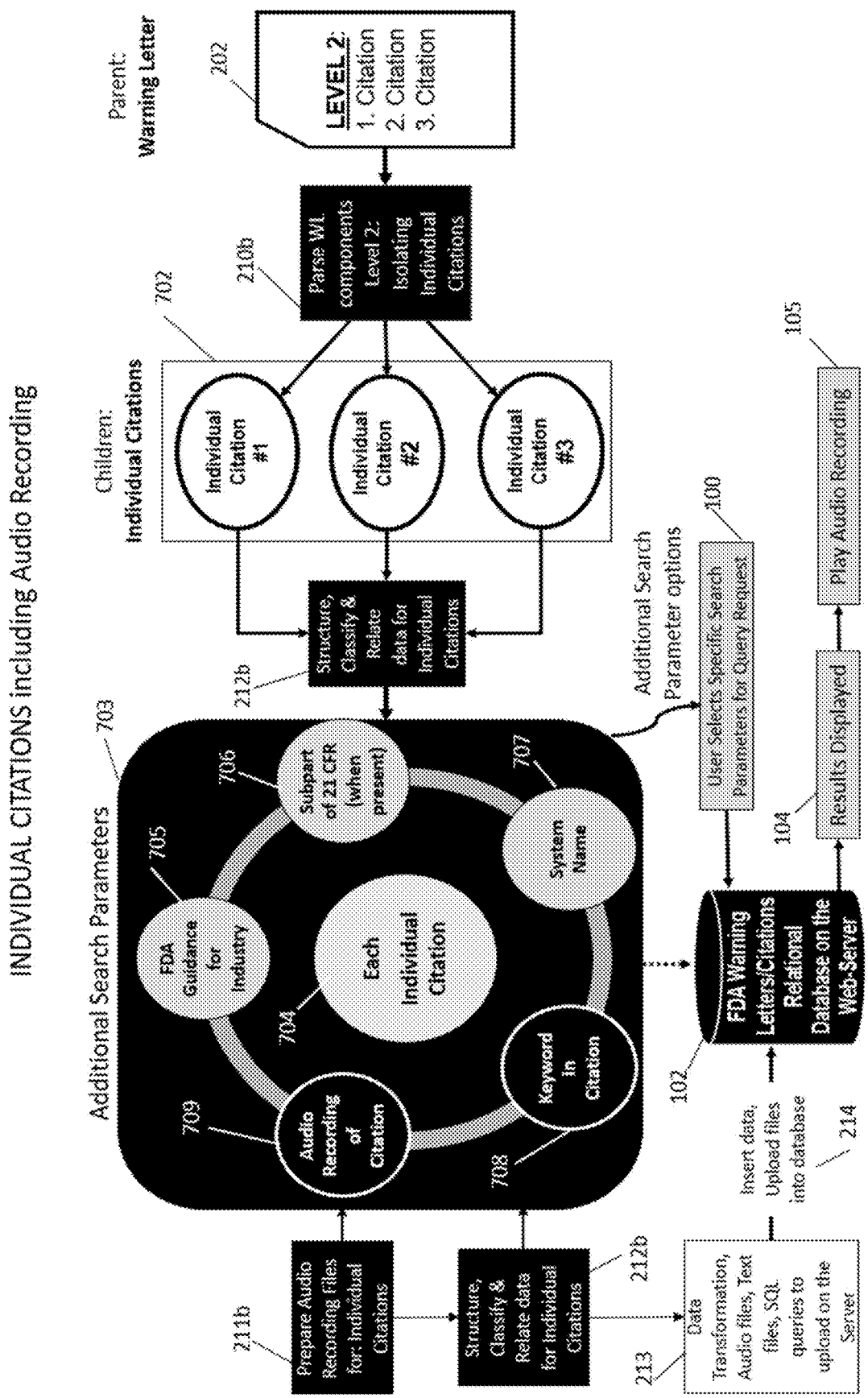
FIG. 7a shows the process of making the Level 2 of this invention that pertains to the Individual Citation searches including their Audio Recordings whereby the user can select specific parameters to get a filtered list to play Audio Recordings of Individual Citations and analyze their results.

Refer to FIG. 7a which illustrates the main steps for making this invention at the Individual Citation level. As outlined earlier, the Warning Letter 202 contains several Citations in a relationship akin to a parent and a child. In the example shown in FIG. 7a the Warning Letter contains three Citations. Each Citation is parsed from the Warning Letter to isolate it individually 210b by selecting the text for the single Citation, copying it and pasting it into a spreadsheet. So, out of a Warning Letter that contains three Citations, three Individual Citations will be isolated as shown 702. Different structural parts of the Individual Citation are classified and organized in a way 212b that matches the structure of their corresponding fields in the database. As described earlier, the various parts into which a Citation is structured for the purpose of this invention are: the description 431, the 21 CFR part that is referred in the description 433 and supporting details 432 as shown in FIG. 4c. The 21 CFR parts are indexed and are further sub-classified. Refer to FIG. 7a, the 21 CFR Parts are sub-classified based on the Subpart of the CFR 706 they belong to, and the 'System' 707 they represent. Each section of 21 CFR Part and the System is indexed in the database to be able to relate to the Individual Citation they link with. If there is no regulatory reference provided for a Category of Warning Letters (e.g. CGMP Warning Letters for many Active Pharmaceutical Ingredients) then this determination is made based on expert professional judgement and FDA Guidances available to enable classification based on Quality System. For Citations that contain reference to a specific "FDA Guidance for Industry", that Citation is also sub-classified based on the referred "FDA Guidance for Industry" 705. The "FDA Guidances for Industry" are also indexed in the database to enable relationship with the Individual Citations. Such sub-classification on multiple dimensions allows each Individual Citation to relate to the value of its sub-classes. This sub-classification process is followed for each Individual Citation 704 based on which a user can select specific search parameters to submit query requests 100. The Audio recording of the Individual Citation is prepared 211(b). This forms another search parameter 709 for user to search Individual Citations either by those that contain only the text of Individual Citations or the ones that have both Audio Recordings and text. The text of each citation is transformed 213 by editing and tagging it in ways that it displays in a well-readable format on the web page. The audio files of the individual Warning Letter are uploaded 214 into the database, and SQL queries 214 are used to insert Individual Citation and associated classification including the hyperlinks to audio files and text document (pdf of full text Warning Letter) into the relational database on the webserver 102. The webserver application files also contain code which enable a user to perform searches for those Citations that contain a specific keyword 708 of user's preference. In FIG. 7a. the box 703 shows the parameters described in this paragraph that are created at the Individual Citation level (Level 2).

When the user prefers to listen to the Audio Recording versions of Individual Citations of his/her choice, the user can enter the search parameter to filter and display those citations that contain Audio recordings and play the audio 105 on the computing device and listen.

Figure 7B:
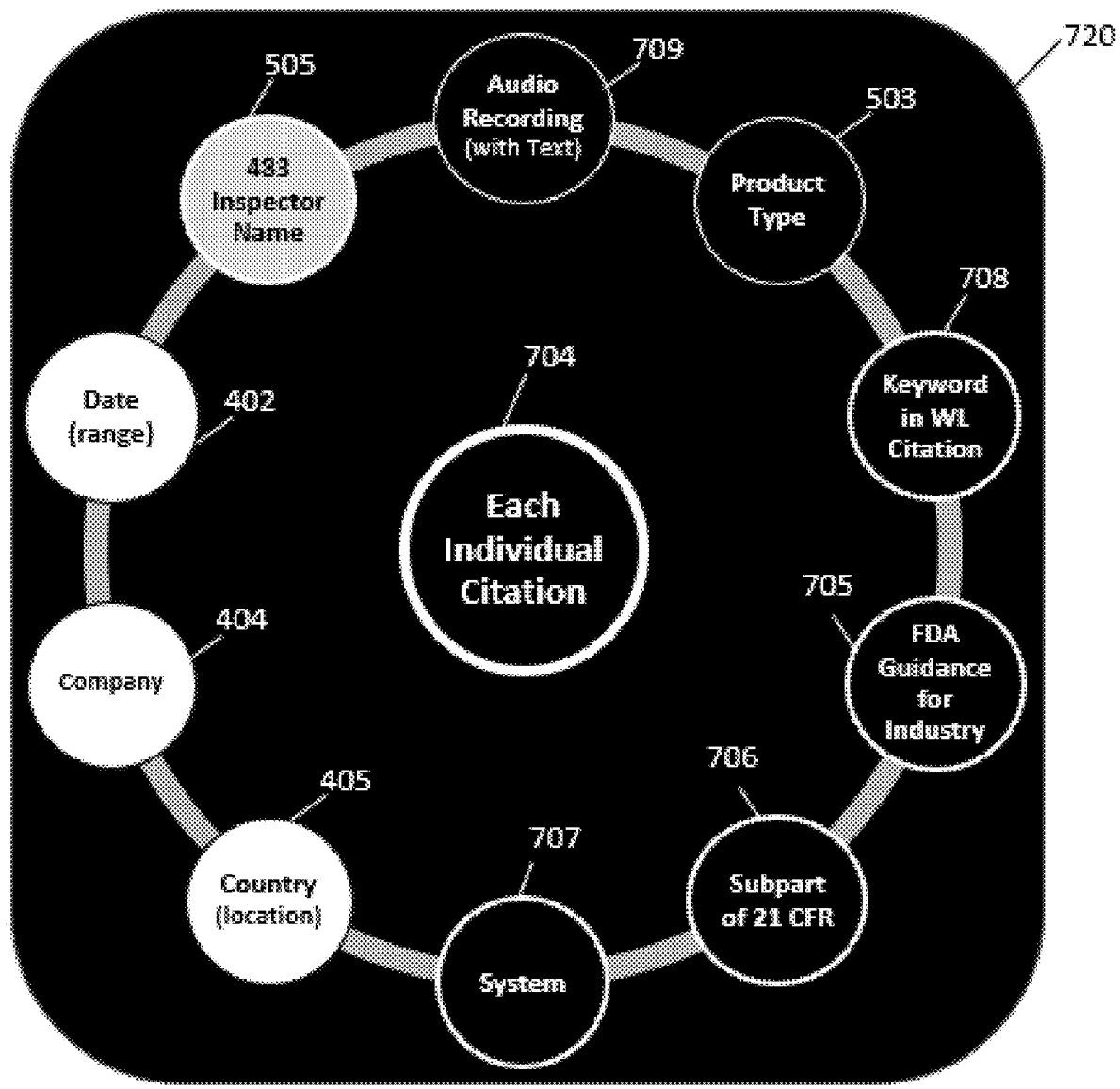
FIG. 7b shows a preferred embodiment of various search parameters options for Individual Citations.

Each Individual Citation in the database is indexed and is also linked to its parent Warning Letter index. Therefore, with the Warning Letter having a parent-child relationship with an Individual Citation, the search parameters of Warning Letters (Level 1) as illustrated in FIG. 5 and described earlier, are also the parameters based on which a user can search for a filtered list of Individual Citation across multiple Warning Letters. Therefore, a user can perform custom searches on Individual Citations by combining the parameters shown in 501 in FIG. 5 for the Individual Warning Letter and the additional search parameters created at the Individual Citation level as shown in 703 in FIG. 7a. The combined listing of ten parameters is shown in FIG. 7b, based on which multiple types of users can perform custom searches on Individual Citations to answer their specific regulatory intelligence needs. In FIG. 7b the three parameters shown in circles with white background and black text represent the parameters whose values have been taken directly from the Warning Letter, namely, Date, Company and Location (Country). The other parameters shown in circles that have black background and white text are derived from heterogenous sources as described earlier and require thought processes and ingenuity to build a system that enables searching in multiple ways at the Individual Citation level. The 483 Inspector name, although not explicit in the Warning Letter, but with some effort can be derived by accessing other sources that can be available upon FOI request, hence the circle background colored gray with black text. The above processes enable creation of single topic record for each 'Individual Citation' that is related with its corresponding product or operation type, system, FDA guidance for industry, citation text with or without the Audio Recording, 483 inspector name, 21 CFR regulatory section text where applicable, Country, Company, Date of Warning Letter, link to Audio Recording, link to the parent Warning Letter and link(s) to the FDA Guidance for industry, in the structured relational database. A user can select any one of these parameters or a logical combination of any two or more of any of these parameters to obtain a filtered listing of Individual Citations to satisfy specific regulatory intelligence information needs. Of course, a user can also listen to the Audio Recording of Individual Citation(s). This system of performing searches and getting the specific information in a preferred format makes this invention unique. How a user can use this invention to search for Individual Citations filterable based a user's preferred criteria is described below along with example illustrations.

Figure 8A:
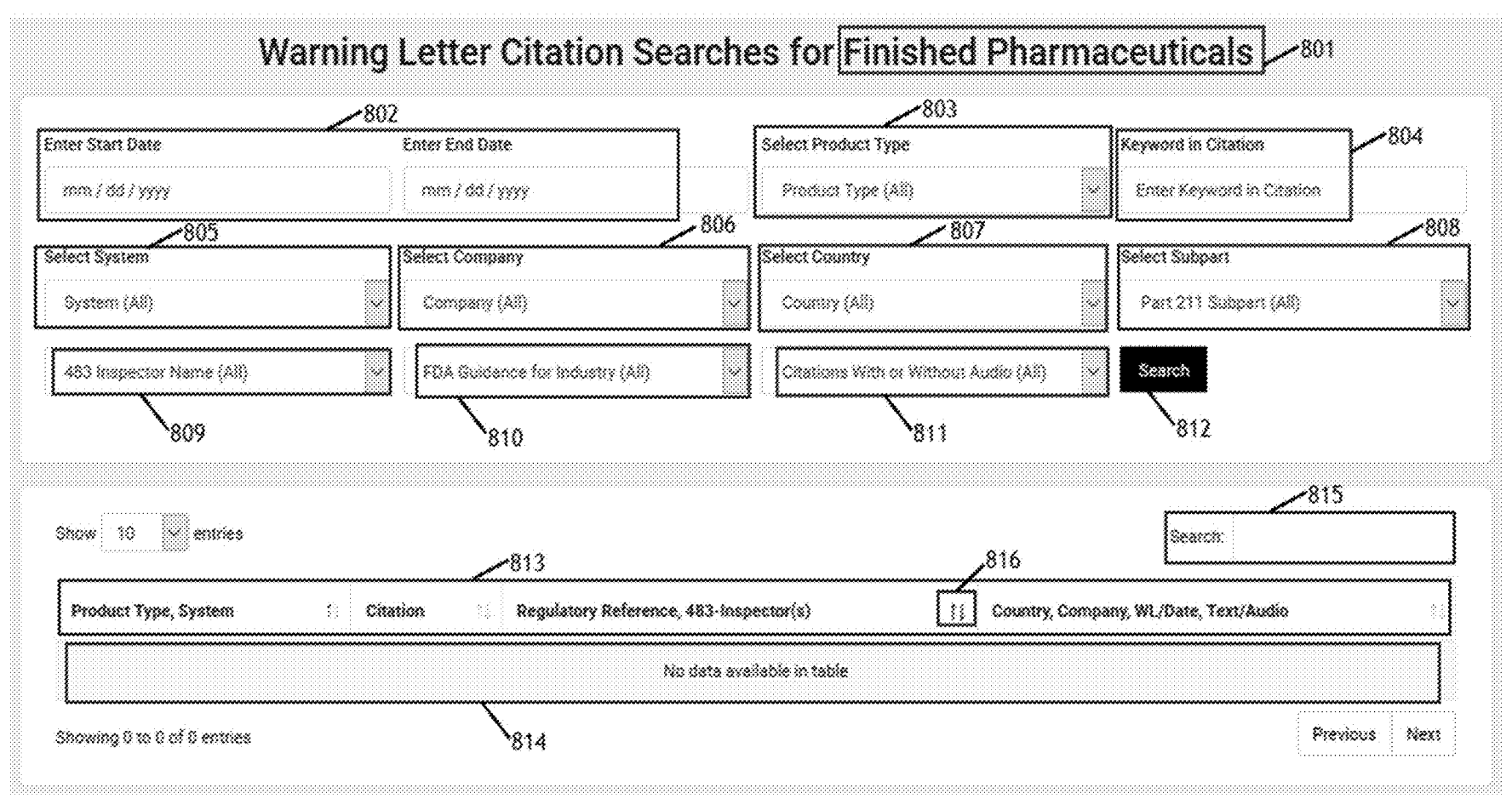

Refer to FIG. 8a which illustrates a GUI that enables selection(s) of the parameter values for a user to perform preferred searches based on user's needs. In this FIG. 801 'Finished Pharmaceuticals' represents the Category of the Warning Letters for which Individual Citations can be searched using the parameters listed below. As noted earlier the user can select any one or a combination of any two or more search parameters to obtain a filtered list of results based on user's specific needs. The search parameters available are: (1) Date Range 802 where a user a can enter the preferred 'Start Date' and/or 'End Date'. (2) 'Product Type' 803, this represents the sub-classification of the Warning Letter 'Category' as has been described earlier (e.g. Oral, Topical or Sterile Product Type for Finished Pharmaceuticals). (3) An input box to search for only those Individual Citations that contain the specific "Keyword" of user's interest which can be typed in this input box 804. (4) Name of the "System" 805 against which an Individual Citation has been sub-classified (e.g. Production, Laboratory, Materials, Quality, Packaging and Labeling, Facilities and Equipment). This generally represents the functional area of user's interest based on how the organization and/or its Systems are structured. (5) Name of the 'Company' 806 to who the Individual Citation was issued in their Warning Letter (6) Name of the 'Country' 807, this allows the user to search Individual Citations for a specific country. (7) 'Part 211 Subpart' 808 to which the specific CFR section referred in the Individual Citation belongs (e.g. Records and Reports, Organizational and Personnel). (8) '483 Inspector Name' 809 in the FDA Form 483 that lead to this Individual Citation in the Warning Letter. (9) 'FDA Guidance for Industry' 810 that the FDA has referred in an Individual Citation (10) 'Citations with or without Audio' 811, selecting this enables a user to get a filtered list of those Individual Citations that are also available in the Audio Recording format for listening or those that are available in Text only format. The database contains a big pool of Individual Citations from the past several years where their text format has been isolated from the Warning Letters. Not all of these are audio recorded. The Audio Recordings of the Individual Citations are available as part of this invention only after a certain date. The user is notified of this date on the webpage. The search parameter 811, therefore allows a user to filter those Citations that contain Audio Recordings along with the text of Individual Citation displayed in the table below or display the Individual Citations that have 'Text only' available. Once the user has made the preferred parameter choices, the user can click the 'Search" button 812 to submit the request to the webserver. In return the webserver will return a filtered listing of records in the table area 814. The table has multiple columns with headings 813. Under each column's headings, the resulting values of the search parameters will be displayed for each record, with one row representing one record that corresponds to a single Individual Citation. A query can result into multiple records that are filtered from the database based on the user's search criteria. The records that will be displayed can be sorted on each column 816 either in an ascending or descending order. (Similar sorting functionality is present on other GUI e.g. for Individual Warning Letter). Based on the text values in the records that get displayed in the table, the user can further filter the records by typing any term in the search input box 815. Having described the GUI for the user to perform searches for Individual Citations (Level 2), examples of using this invention are described below.

If the user does not select any specific parameter and clicks the 'Search" button, then by default all records of Individual Citations that are in the database will be returned and displayed in the table on the user's screen. The primary purpose of the examples that follow below is to show the placeholders where the different contents of the results appears on the webpage to help the reader understand the functionality of the invention, and not on the actual content of the text which is only exemplary.

Example 1

Figure 8B:
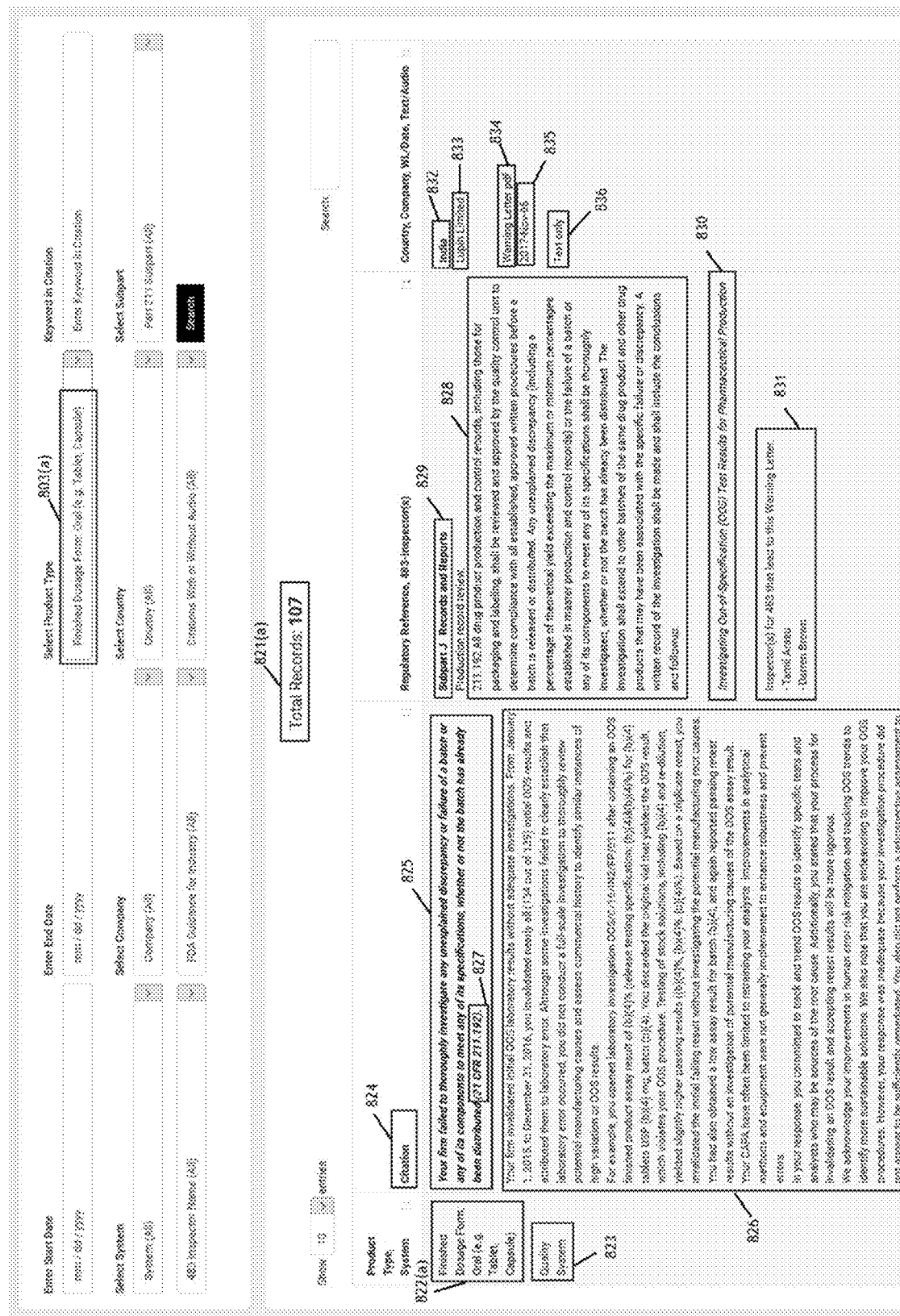
FIG. 8b shows an example of the filtered list of results based on the user selecting a single parameter (Product Type) to search for Individual Citations.

The first example that is illustrated in FIG. 8b is a representation where the user has selected only one parameter (which represents step 100 in FIG. 3). In this case it is 'Product Type'. The value of the parameter is selected from the menu options available by clicking the drop-down arrow. In this example, the user has selected the subclass "Finished Dosage Form: Oral (e.g. Tablet, Capsule)" 803(a). Based on this query request (step 101 in FIG. 3), the webserver returns the record results (step 102 in FIG. 3) from the database 102. The value of the 'Total Records' 821(a) filtered from the database for this 'Product Type' subclass is shown to be '107'. These records get displayed on the webpage (step 104 in FIG. 3) with each row of the table containing a single record that corresponds to a single Individual Citation. The values of the various parameters that are displayed are represented by: 822(a)—"Finished Dosage Form: Oral (e.g. Tablet, Capsule)" under its column heading and equals the specific parameter value selected in this example; 825—text contained in the description part of the Individual Citation; 826—supporting facts or details of the Individual Citation (only partial text is shown); 827—reference to the 21 CFR section number that is violated; 828—actual regulatory text contained in the specific 21 CFR section cited alongside the Citation; this provides user the convenience to not make the extra effort to go and find elsewhere what this regulatory section requires for ensuring CGMP compliance; 829—name of the 21 CFR Subpart to which this section 828 belongs; 830—ready to click hyperlink to display the full text pdf of the 'FDA Guidance for Industry' document; 831—name(s) of the inspector(s) in Form 483 that lead to the Warning Letter associated with this Individual Citation; 832—name of the Country of location of the company or manufacturing facility with which this Individual Citation is associated; 833—name of the Company with which this Individual Citation is associated; 834—ready to click hyperlink to display pdf of the full text of the Warning Letter associated with this Citation; 835—date of issuance of the associated Warning Letter; 836—if the Individual Citation is available only in the form of text format then display 'Text only', if the Audio Recording format is available then this value is replaced by the image of the audio player that links to the Audio Recording which can be played for listening by the user. Such a presentation as shown in FIG. 8b allows the user to zero-in on those specific pieces of regulatory information that the user is interested in by selecting value of any of the multiple parameter(s) listed. In this example, only a single parameter value for 'Product Type' was chosen.

Example 2

Figure 8C:
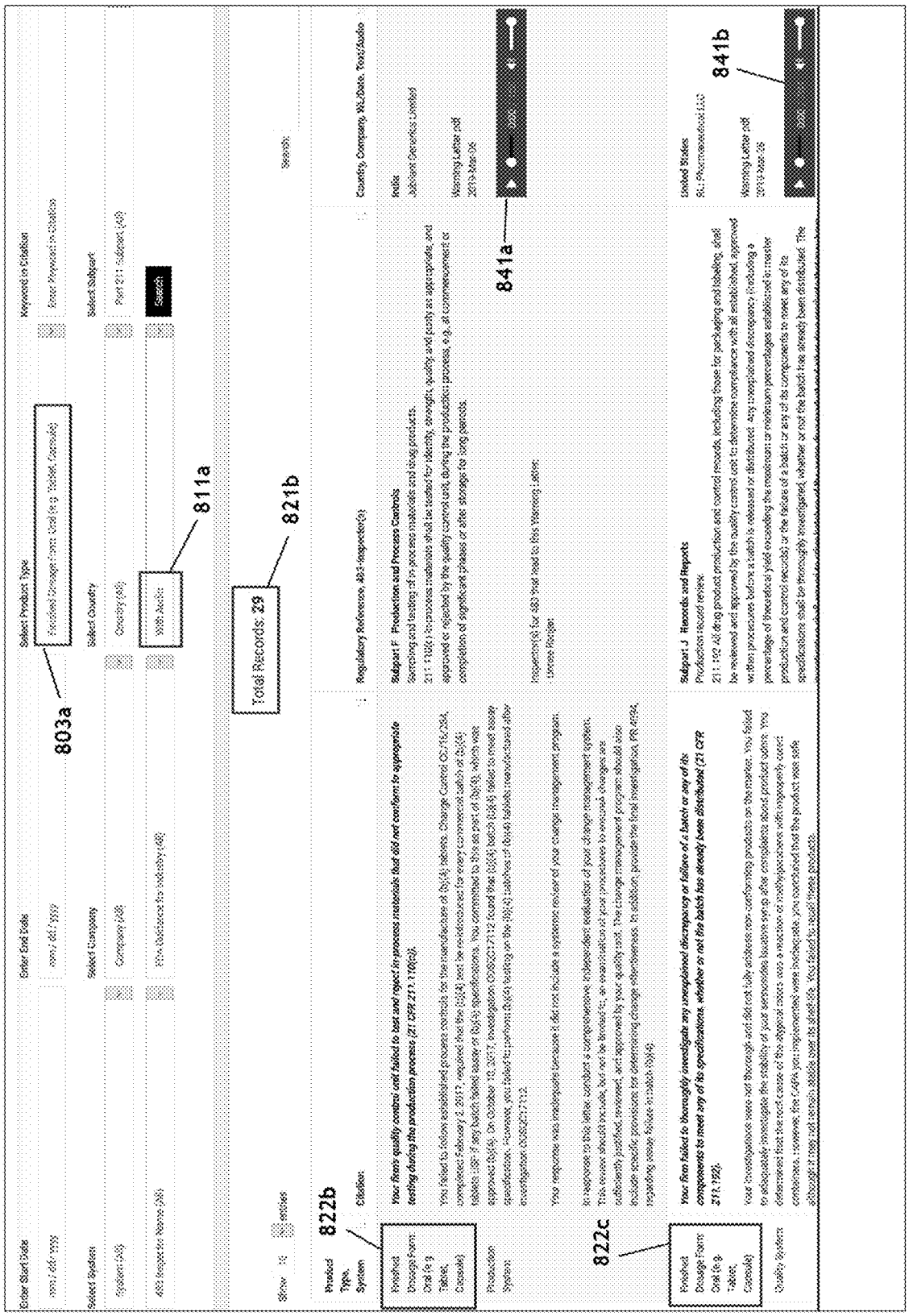
FIG. 8c shows an example of the filtered list of results displaying Audio Recordings of the Individual Citations along with their corresponding text based on the user selecting two parameters one of which is to search "With Audio".

FIG. 8c illustrates an example where a user has selected two parameters to narrow down the search. Keeping the parameter selected the same from example 1 803(a), which is "Finished Dosage Form (e.g. Tablet, Capsule)" that had resulted in 107 of Total records 821(a), an additional parameter 811a is added to the search criteria to get a filtered listing of those records that provide Audio recording of the text of Individual Citation. As a result, the values of the further filtered records now show the following: 821b—'Total Records' to be '29', this means that out of the total records of '107' in the database for "Finished Dosage Form (e.g. Tablet, Capsule)", there are 29 for which the Audio Recording format is available. In this table only the first two rows out of 29 are displayed; 841a-Audio player that is linked to the Audio Recording of the text of the Individual Citation shown in the first row of the table under the heading 'Citation'. The user can click the 'play' button represented by the small triangle to listen to the audio recording; 841b-Audio player link for the Individual Citation text in the second row of the table; 822b and 822c-show the Product Type values to which the corresponding Individual Citation text listed under the column heading 'Citation' is shown. The values in this case are equal to the first parameter selected, that is, "Finished Dosage Form (e.g. Tablet, Capsule)".

Example 3

Figure 8D:
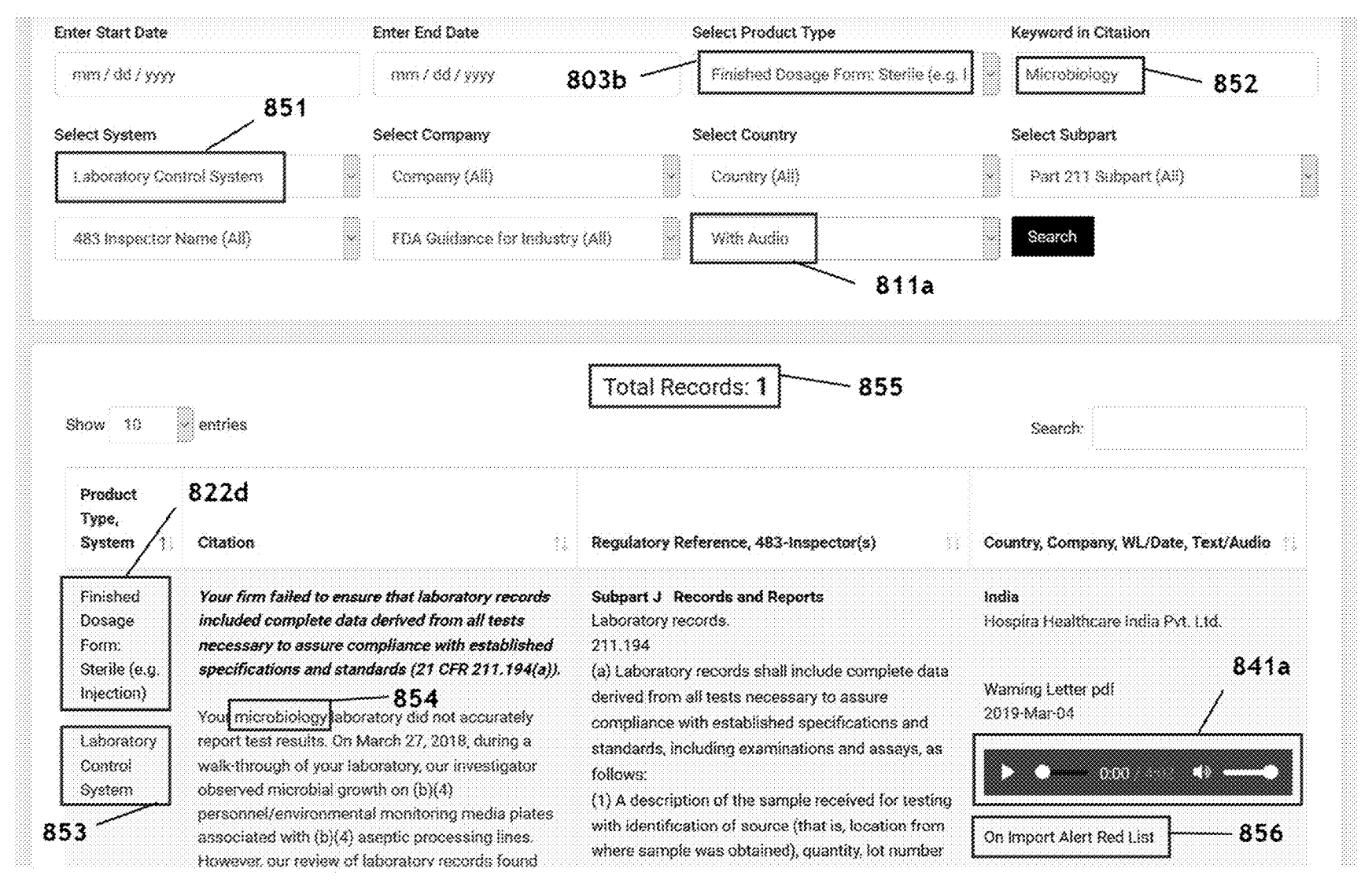

FIG. 8d illustrates an example where a user has selected a combination of four parameters to zero-in on information for some very specific need. A user who works in the Laboratory that tests Sterile Finished Pharmaceuticals may have such a need. These parameters are: 803b-Product Type as "Finished Dosage Form: Sterile (e.g. Injection)"; 851—System selected is "Laboratory Control System"; 852—The specific keyword term that the user is looking for in Individual Citations is "Microbiology" and filter them out; 811a—The user is interested to listen to the Audio Recording format of the Individual Citation(s) since the user is on the go e.g. while driving or walking. The search result based on these query parameters is displayed in the table in FIG. 8d and contains a single record as shown in 855. The different values are represented as follows: 822d—is the Product Type, which is equal to the "Finished Dosage Form: Sterile (e.g. Injection)" that has been selected by the user; 853—is the System name, which is equal to the "Laboratory Control System" selected; 854—is the keyword shown as present in the Citation which equal to "Microbiology" that was typed by the user in the input box 852; 841a—is the audio player that is linked to the Audio Recording of the text for this Individual Citation that is shown under the heading 'Citation'; 856—if the Warning Letter linked with this Citation also contains reference to import alerts that the FDA placed on the products manufactured by this company, then that subclassification is also flagged here as 'On import alert Red list'.

As described above, the multiple ways of using this invention whereby different types of users can perform filtered searches from a pool of information based on their specific regulatory intelligence needs quickly and conveniently while at the same time have the option of listening to the Audio Recording formats is what makes this invention stand apart from prior art.

Figure 9:
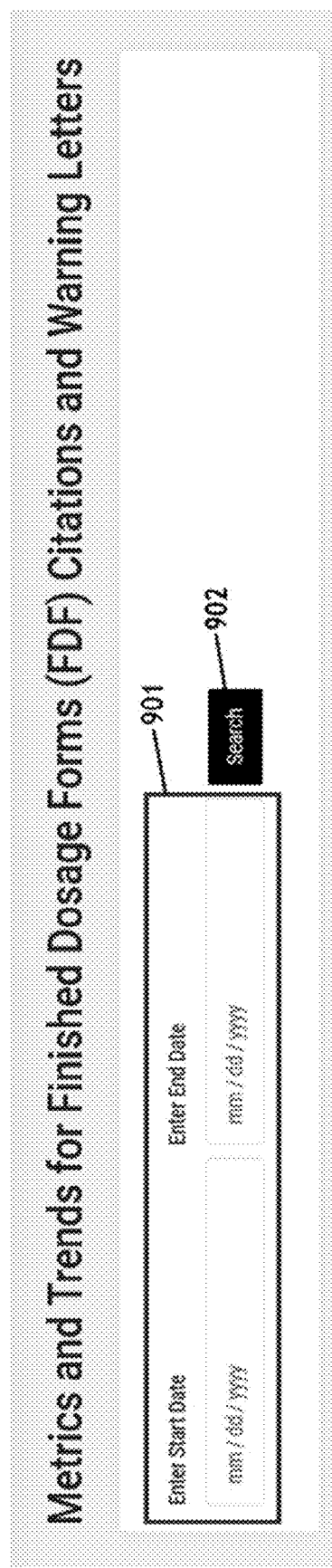
FIG. 9 shows an example of a Graphical User Interface for the user to select preferred date-range to get data on aggregate metrics and trends Warning Letters and Individual Citations.

Aggregate Metrics and Trends: Given that the components of Warning Letters and the pool of Individual Citations derived from them is structured, classified and integrated systematically in a searchable relational database as described above, this invention also allows the users to study metrics and trends at an aggregated level for both the Individual Citations and Warning Letters over a selected period of time of user's choice. An example GUI is shown in FIG. 9 where a user can select a preferred date range 901 (i.e. start and end date of choice) and click the 'Search' button 902 and get the desired results that are automatically generated on the webpage based on the parameters to which the Warning Letters and Individual Citations are related. For the date range entered, the types of aggregate results based on the predetermined parameters are described below.

Figure 10:
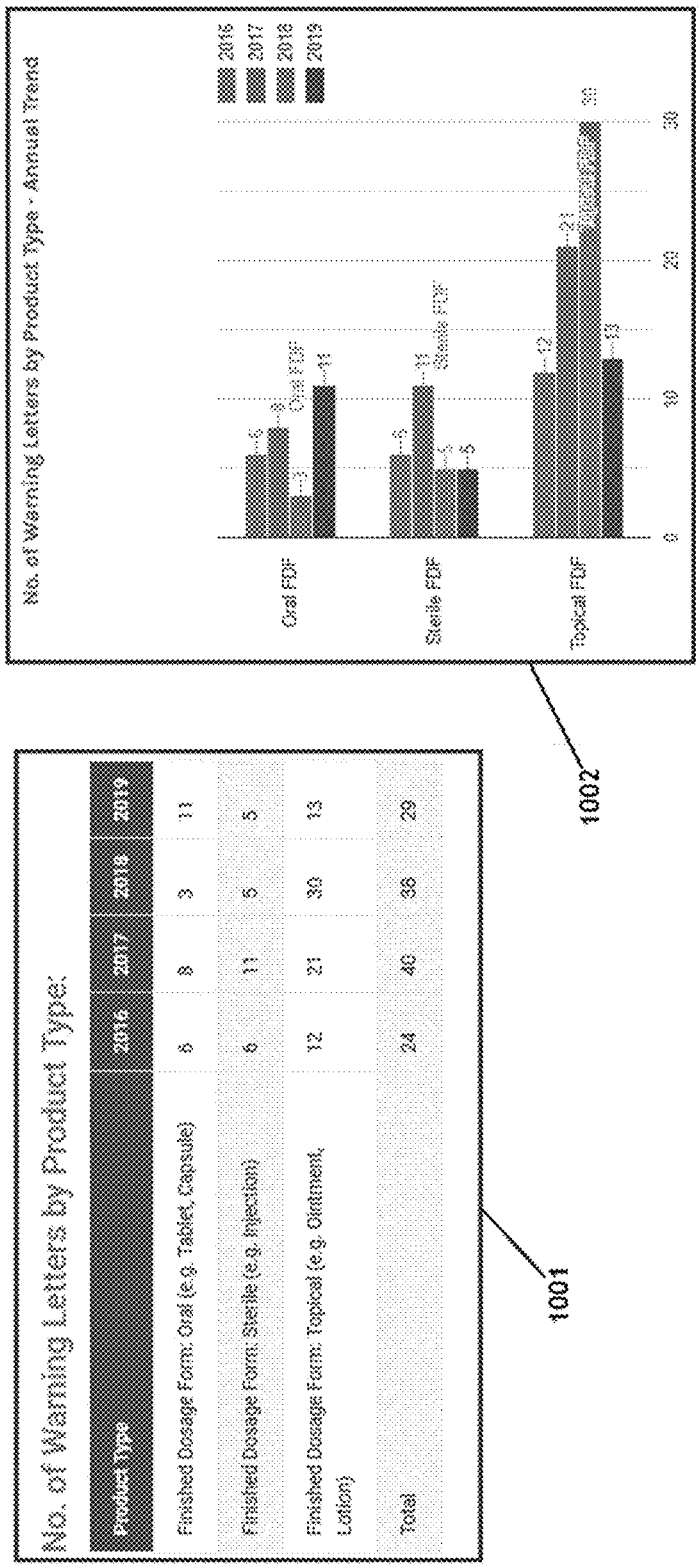
FIG. 10 illustrates an example of aggregate metrics and trends related to Warning Letter by Product Type in tabular and graphical forms.

For Warning Letters, the aggregate trends and metrics for Warning Letters during a period include but are not limited to: Warning Letters trends by Product Type, an example for Warning Letters issued for Finished Dosage Form (FDF) Product Types (namely, Oral, Sterile and Topical) over multiple years is illustrated in tabular 1001 and graphical 1002 form in FIG. 10.

Figure 11A:
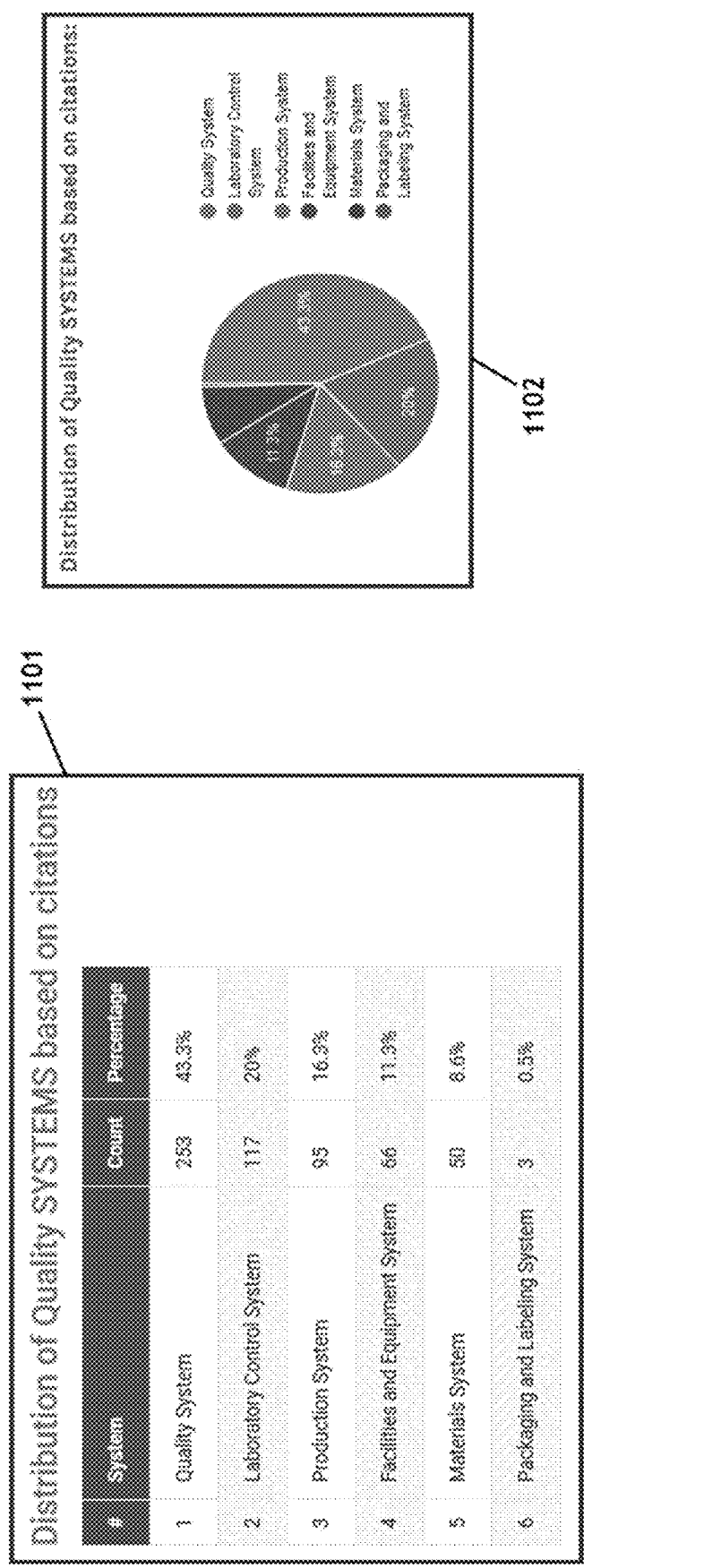
FIG. 11a illustrates an example of aggregate metrics and distribution trend of Individual Citations based on the Quality Systems they represent in tabular and graphical forms.
Figure 11B:
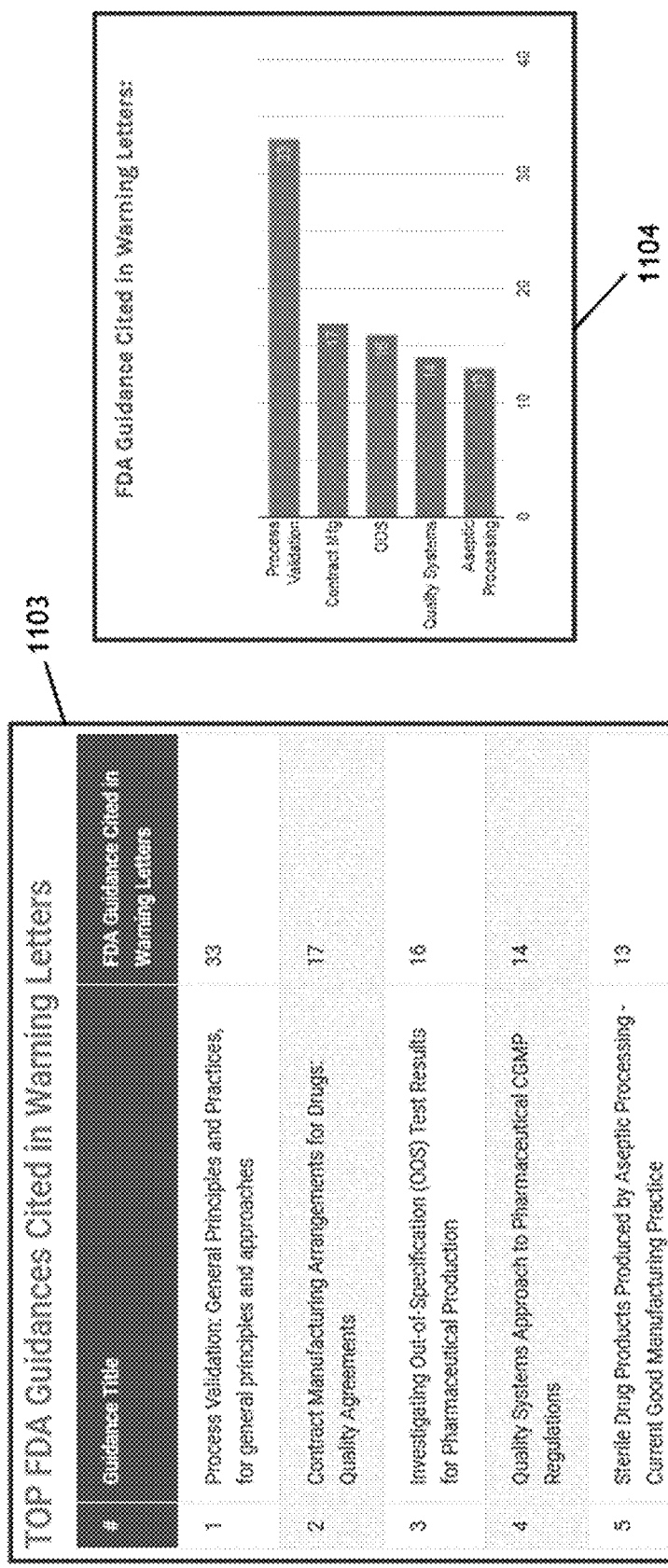
FIG. 11b illustrates an example of aggregate metrics and trends related to top FDA Guidances cited in Warning Letter Citations in tabular and graphical forms.

The types of aggregate trends and metrics for Individual Citations during a period include but are not limited to: (1) Distribution of Individual Citations based on the quality system they represent, an example showing results over a period are shown in tabular 1101 and graphical 1102 form in FIG. 11a. (2) Metrics for FDA Guidances for Industry cited in Individual Citations of the Warning Letters over a period, an example showing results of top FDA Guidances cited in the Warning Letters for Finished Pharmaceuticals (Finished Dosage Forms) is illustrated in tabular 1103 and graphical 1104 form in FIG. 11b. In addition, there are other metrics and trends that this invention enables like top 21 CFR Part Sections cited based on Individual Citations.

What is claimed is:
1. A computer-implemented method to search regulatory information on individual citations and/or product type from warning letters, the method comprising:
(a) subcategorizing a warning letter based on a value of a parameter: product type;
(b) parsing the warning letter to isolate each individual citation from a parent warning letter wherein each individual citation is further parsed into components: description of citation, supporting details, 21 CFR section;
(c) classifying the parent warning letter based on values of the parameters: company, location, investigator name, date;
(d) subclassifying each individual citation based on values of at least one of the parameters: system name, 21 CFR subpart, guidance for industry, format of citation;
(e) analyzing text of the citation wherein the data in the citation is transformed by tagging for display on a webpage and linked to document files related with the citation through hyperlinks;
(f) indexing and relating individual citations with the parent warning letter along with the values of the parameters based on subcategorizing, classifying and subclassifying, to create a single topic record for each individual citation and storing the records in a relational database along with the document links on a webserver;
(g) implementing a rule-based search-engine through computer-code on the webserver that executes search queries to retrieve individual citation records from the database based on values of the parameters submitted in a search query wherein the webserver filters the requested records that are classified and made searchable by criteria: product type, investigator, system, format of citation as audio and/or text guidance, company, location, 21 CFR section and subpart, date, keyword in citations;
(h) providing a user with a graphical user interface (GUI) on a computing device to select preferred values for the search query parameters on a webpage, and submitting the query request to the webserver;

(i) executing the submitted query on the webserver by the search-engine to retrieve and return a filtered list of specific individual citation records from the database based on user's search request values; and (j) displaying the filtered list of individual citation records returned from the webserver on the user's GUI along with the user's preferred format on a webpage.

2. The method of claim 1, wherein the regulatory information on individual citations is made available to the user in an audio recorded format that the user can listen to by clicking the play button link displayed on the webpage for the individual citation.

3. The method of claim 2, wherein the regulatory information of a parent warning letter containing a specific set of individual citations is made available to the user in an audio recorded format based on user's preferred search values for one or more of the parameters: product type, company, location, date, investigator name.

4. The method of claim 1, wherein the regulatory information on individual citations and/or product type of the warning letters is made available to the user in a text format on the webpage that the user can read for analyzing and/or printing.

5. The method of claim 1, wherein a regulatory text of a 21 CFR section number that is referenced in the individual citation is retrieved from the database and displayed with the individual citation record for the user's reference.

6. The method of claim 1, further comprising: subclassifying the 'format of citation' parameter for a user to select search option based on text of individual citations with or without audio.

7. The method of claim 1, where the user's preferred search criteria for individual citation records is based on values of product type parameter and at least one or more of the following parameters:

(a) date range;

(b) keyword in citation;

(c) system name;

(d) company;

(e) location e.g., country;

(f) 21 CFR subpart;

(g) investigator name;

(h) guidance for industry;

(i) format of citation with or without audio.

8. The method of claim 1, further comprising: classifying the parent warning letter based on import alert parameter for the user to perform search.

9. The method of claim 1, wherein a set of aggregate metrics and trends for the individual citations can be automatically displayed for the user in a tabulated and/or graphical format based on product type and/or specified date-range parameters, the aggregate metrics and trends including the following:

(a) distribution of individual citations based on the system name represented;

(b) metrics for guidances for industry cited in the individual citations of the warning letters.

* * * * *